US012705303B2

(12) United States Patent
Anderson et al.

(10) Patent No.: US 12,705,303 B2
(45) Date of Patent: Aug. 11, 2026

(54) ZERO PADDING FOR CONVOLUTIONAL NEURAL NETWORKS

(71) Applicant: Texas Instruments Incorporated, Dallas, TX (US)

(72) Inventors: Timothy David Anderson, University Park, TX (US); Asheesh Bhardwaj, Allen, TX (US); Burton Adrik Copeland, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 1047 days.

(21) Appl. No.: 17/877,882

(22) Filed: Jul. 30, 2022

(65) Prior Publication Data

US 2024/0045922 A1 Feb. 8, 2024

(51) Int. Cl.

| | |
|---|---|
| ***G06F 17/16*** | (2006.01) |
| ***G06F 12/02*** | (2006.01) |
| ***G06F 17/15*** | (2006.01) |

(52) U.S. Cl.

CPC .......... *G06F 17/16* (2013.01); *G06F 12/0207* (2013.01); *G06F 17/153* (2013.01); *G06F 2212/454* (2013.01)

(58) Field of Classification Search

CPC ...... G06F 17/153; G06F 17/16; G06F 7/5443; G06F 2212/454; G06F 12/0207

See application file for complete search history.

(56) References Cited

U.S. PATENT DOCUMENTS

| | | | | |
|---|---|---|---|---|
| 11,113,062 | B2 | 9/2021 | Bhardwaj et al. | |
| 11,231,929 | B2 | 1/2022 | Tran et al. | |
| 11,249,759 | B2 | 2/2022 | Leven et al. | |
| 11,256,508 | B2 | 2/2022 | Bhardwaj et al. | |
| 11,501,147 | B1 * | 11/2022 | Nair | G06N 3/0464 |
| 12,367,147 | B2 * | 7/2025 | Bhardwaj | G06F 12/0837 |
| 2010/0306300 | A1 * | 12/2010 | Lu | G06F 17/16 708/520 |
| 2021/0042624 | A1 * | 2/2021 | Matveev | G06N 3/0464 |
| 2021/0056396 | A1 * | 2/2021 | Majnemer | G06N 3/0464 |
| 2026/0017200 | A1 * | 1/2026 | Bhardwaj | G06F 12/0837 |

* cited by examiner

*Primary Examiner* — Matthew D Sandifer

(74) *Attorney, Agent, or Firm* — Kenneth Liu; Frank D. Cimino

(57) ABSTRACT

In described examples, an integrated circuit (IC) includes a matrix multiplication accelerator including a first memory, a second memory, and a memory controller. The second memory is configured to store multiple rows of an input feature map on a single line of cells of the memory, and to store a filter kernel. The memory controller reads multiple contiguous memory vectors of the second memory, different ones of the contiguous memory vectors corresponding to different portions of the input feature map. The memory controller also replaces (with padding zeroes) values of respective ones of the contiguous memory vectors. The number and location of replaced values are selected in response to a column index of an element of the filter kernel in response to which the respective contiguous memory vector is read. Zero padded contiguous memory vectors are written to the first memory.

20 Claims, 25 Drawing Sheets

FIG. 9

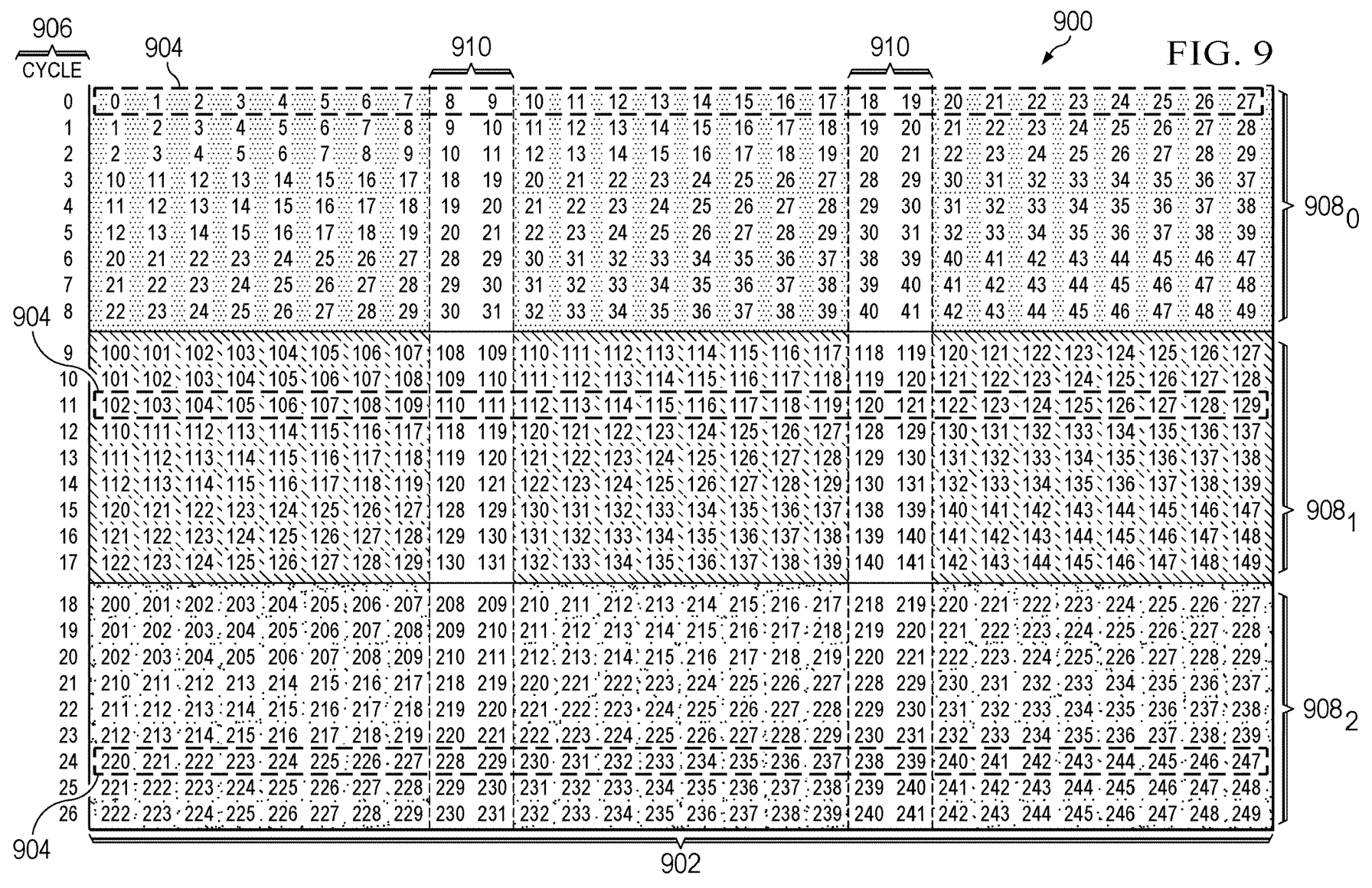

| CYCLE | | | | | | | | | | | | | | | | | | | | | | | | | | | |
|---|---|---|---|---|---|---|---|---|---|---|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| 1 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 2 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 3 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
| 4 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
| 5 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
| 6 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
| 7 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| 8 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
| 9 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 |
| 10 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | 128 |
| 11 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | 128 | 129 |
| 12 | 110 | 111 | 112 | 113 | 114 | 115 | 116 | 117 | 118 | 119 | 120 | 121 | 122 | 123 | 124 | 125 | 126 | 127 | 128 | 129 | 130 | 131 | 132 | 133 | 134 | 135 | 136 | 137 |
| 13 | 111 | 112 | 113 | 114 | 115 | 116 | 117 | 118 | 119 | 120 | 121 | 122 | 123 | 124 | 125 | 126 | 127 | 128 | 129 | 130 | 131 | 132 | 133 | 134 | 135 | 136 | 137 | 138 |
| 14 | 112 | 113 | 114 | 115 | 116 | 117 | 118 | 119 | 120 | 121 | 122 | 123 | 124 | 125 | 126 | 127 | 128 | 129 | 130 | 131 | 132 | 133 | 134 | 135 | 136 | 137 | 138 | 139 |
| 15 | 120 | 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 | 145 | 146 | 147 |
| 16 | 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 | 145 | 146 | 147 | 148 |
| 17 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 | 145 | 146 | 147 | 148 | 149 |
| 18 | 200 | 201 | 202 | 203 | 204 | 205 | 206 | 207 | 208 | 209 | 210 | 211 | 212 | 213 | 214 | 215 | 216 | 217 | 218 | 219 | 220 | 221 | 222 | 223 | 224 | 225 | 226 | 227 |
| 19 | 201 | 202 | 203 | 204 | 205 | 206 | 207 | 208 | 209 | 210 | 211 | 212 | 213 | 214 | 215 | 216 | 217 | 218 | 219 | 220 | 221 | 222 | 223 | 224 | 225 | 226 | 227 | 228 |
| 20 | 202 | 203 | 204 | 205 | 206 | 207 | 208 | 209 | 210 | 211 | 212 | 213 | 214 | 215 | 216 | 217 | 218 | 219 | 220 | 221 | 222 | 223 | 224 | 225 | 226 | 227 | 228 | 229 |
| 21 | 210 | 211 | 212 | 213 | 214 | 215 | 216 | 217 | 218 | 219 | 220 | 221 | 222 | 223 | 224 | 225 | 226 | 227 | 228 | 229 | 230 | 231 | 232 | 233 | 234 | 235 | 236 | 237 |
| 22 | 211 | 212 | 213 | 214 | 215 | 216 | 217 | 218 | 219 | 220 | 221 | 222 | 223 | 224 | 225 | 226 | 227 | 228 | 229 | 230 | 231 | 232 | 233 | 234 | 235 | 236 | 237 | 238 |
| 23 | 212 | 213 | 214 | 215 | 216 | 217 | 218 | 219 | 220 | 221 | 222 | 223 | 224 | 225 | 226 | 227 | 228 | 229 | 230 | 231 | 232 | 233 | 234 | 235 | 236 | 237 | 238 | 239 |
| 24 | 220 | 221 | 222 | 223 | 224 | 225 | 226 | 227 | 228 | 229 | 230 | 231 | 232 | 233 | 234 | 235 | 236 | 237 | 238 | 239 | 240 | 241 | 242 | 243 | 244 | 245 | 246 | 247 |
| 25 | 221 | 222 | 223 | 224 | 225 | 226 | 227 | 228 | 229 | 230 | 231 | 232 | 233 | 234 | 235 | 236 | 237 | 238 | 239 | 240 | 241 | 242 | 243 | 244 | 245 | 246 | 247 | 248 |
| 26 | 222 | 223 | 224 | 225 | 226 | 227 | 228 | 229 | 230 | 231 | 232 | 233 | 234 | 235 | 236 | 237 | 238 | 239 | 240 | 241 | 242 | 243 | 244 | 245 | 246 | 247 | 248 | 249 |

1000

1006 1006

FEATURE MAP

| zero | zero | zero | zero | zero | zero | zero | zero | zero | zero | zero | zero |
|---|---|---|---|---|---|---|---|---|---|---|---|
| zero | 0 | 1 | 2 | 3 | 4 | 5 | 6 | 7 | 8 | 9 | zero |
| zero | 10 | 11 | 12 | 13 | 14 | 15 | 16 | 17 | 18 | 19 | zero |
| zero | 20 | 21 | 22 | 23 | 24 | 25 | 26 | 27 | 28 | 29 | zero |
| zero | 30 | 31 | 32 | 33 | 34 | 35 | 36 | 37 | 38 | 39 | zero |
| zero | 40 | 41 | 42 | 43 | 44 | 45 | 46 | 47 | 48 | 49 | zero |
| zero | 50 | 51 | 52 | 53 | 54 | 55 | 56 | 57 | 58 | 59 | zero |
| zero | 60 | 61 | 62 | 63 | 64 | 65 | 66 | 67 | 68 | 69 | zero |
| zero | 70 | 71 | 72 | 73 | 74 | 75 | 76 | 77 | 78 | 79 | zero |
| zero | 80 | 81 | 82 | 83 | 84 | 85 | 86 | 87 | 88 | 89 | zero |
| zero | 90 | 91 | 92 | 93 | 94 | 95 | 96 | 97 | 98 | 99 | zero |
| zero | zero | zero | zero | zero | zero | zero | zero | zero | zero | zero | zero |
| zero | 100 | 101 | 102 | 103 | 104 | 105 | 106 | 107 | 108 | 109 | zero |
| zero | 110 | 111 | 112 | 113 | 114 | 115 | 116 | 117 | 118 | 119 | zero |
| zero | 120 | 121 | 122 | 123 | 124 | 125 | 126 | 127 | 128 | 129 | zero |
| zero | 130 | 131 | 132 | 133 | 134 | 135 | 136 | 137 | 138 | 139 | zero |
| zero | 140 | 141 | 142 | 143 | 144 | 145 | 146 | 147 | 148 | 149 | zero |
| zero | 150 | 151 | 152 | 153 | 154 | 155 | 156 | 157 | 158 | 159 | zero |
| zero | 160 | 161 | 162 | 163 | 164 | 165 | 166 | 167 | 168 | 169 | zero |
| zero | 170 | 171 | 172 | 173 | 174 | 175 | 176 | 177 | 178 | 179 | zero |
| zero | 180 | 181 | 182 | 183 | 184 | 185 | 186 | 187 | 188 | 189 | zero |
| zero | 190 | 191 | 192 | 193 | 194 | 195 | 196 | 197 | 198 | 199 | zero |
| zero | zero | zero | zero | zero | zero | zero | zero | zero | zero | zero | zero |
| zero | 200 | 201 | 202 | 203 | 204 | 205 | 206 | 207 | 208 | 209 | zero |
| zero | 210 | 211 | 212 | 213 | 214 | 215 | 216 | 217 | 218 | 219 | zero |
| zero | 220 | 221 | 222 | 223 | 224 | 225 | 226 | 227 | 228 | 229 | zero |
| zero | 230 | 231 | 232 | 233 | 234 | 235 | 236 | 237 | 238 | 239 | zero |
| zero | 240 | 241 | 242 | 243 | 244 | 245 | 246 | 247 | 248 | 249 | zero |
| zero | 250 | 251 | 252 | 253 | 254 | 255 | 256 | 257 | 258 | 259 | zero |
| zero | 260 | 261 | 262 | 263 | 264 | 265 | 266 | 267 | 268 | 269 | zero |
| zero | 270 | 271 | 272 | 273 | 274 | 275 | 276 | 277 | 278 | 279 | zero |
| zero | 280 | 281 | 282 | 283 | 284 | 285 | 286 | 287 | 288 | 289 | zero |
| zero | 290 | 291 | 292 | 293 | 294 | 295 | 296 | 297 | 298 | 299 | zero |
| zero | zero | zero | zero | zero | zero | zero | zero | zero | zero | zero | zero |

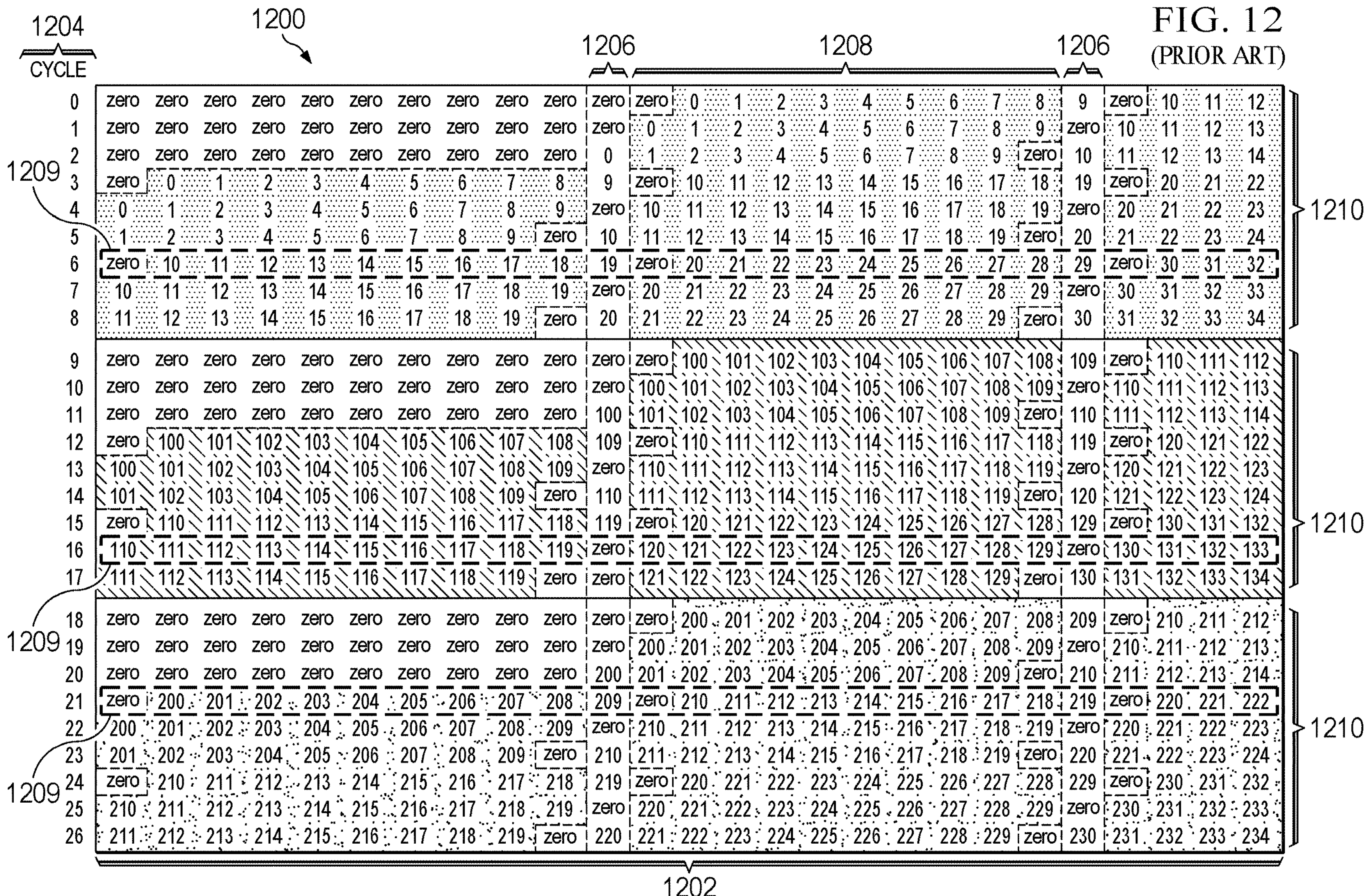

| CYCLE | | | | | | | | | | | | | | | | | | | | | | | | | | |
|---|---|---|---|---|---|---|---|---|---|---|---|---|---|---|---|---|---|---|---|---|---|---|---|---|---|---|
| 0 | zero | zero | zero | zero | zero | zero | zero | zero | zero | zero | zero | zero | 0 | 1 | 2 | 3 | 4 | 5 | 6 | 7 | 8 | 9 | zero | 10 | 11 | 12 |
| 1 | zero | zero | zero | zero | zero | zero | zero | zero | zero | zero | zero | 0 | 1 | 2 | 3 | 4 | 5 | 6 | 7 | 8 | 9 | zero | 10 | 11 | 12 | 13 |
| 2 | zero | zero | zero | zero | zero | zero | zero | zero | zero | zero | 0 | 1 | 2 | 3 | 4 | 5 | 6 | 7 | 8 | 9 | zero | 10 | 11 | 12 | 13 | 14 |
| 3 | zero | 0 | 1 | 2 | 3 | 4 | 5 | 6 | 7 | 8 | 9 | zero | 10 | 11 | 12 | 13 | 14 | 15 | 16 | 17 | 18 | 19 | zero | 20 | 21 | 22 |
| 4 | 0 | 1 | 2 | 3 | 4 | 5 | 6 | 7 | 8 | 9 | zero | 10 | 11 | 12 | 13 | 14 | 15 | 16 | 17 | 18 | 19 | zero | 20 | 21 | 22 | 23 |
| 5 | 1 | 2 | 3 | 4 | 5 | 6 | 7 | 8 | 9 | zero | 10 | 11 | 12 | 13 | 14 | 15 | 16 | 17 | 18 | 19 | zero | 20 | 21 | 22 | 23 | 24 |
| 6 | zero | 10 | 11 | 12 | 13 | 14 | 15 | 16 | 17 | 18 | 19 | zero | 20 | 21 | 22 | 23 | 24 | 25 | 26 | 27 | 28 | 29 | zero | 30 | 31 | 32 |
| 7 | 10 | 11 | 12 | 13 | 14 | 15 | 16 | 17 | 18 | 19 | zero | 20 | 21 | 22 | 23 | 24 | 25 | 26 | 27 | 28 | 29 | zero | 30 | 31 | 32 | 33 |
| 8 | 11 | 12 | 13 | 14 | 15 | 16 | 17 | 18 | 19 | zero | 20 | 21 | 22 | 23 | 24 | 25 | 26 | 27 | 28 | 29 | zero | 30 | 31 | 32 | 33 | 34 |
| 9 | zero | zero | zero | zero | zero | zero | zero | zero | zero | zero | zero | zero | 100 | 101 | 102 | 103 | 104 | 105 | 106 | 107 | 108 | 109 | zero | 110 | 111 | 112 |
| 10 | zero | zero | zero | zero | zero | zero | zero | zero | zero | zero | zero | 100 | 101 | 102 | 103 | 104 | 105 | 106 | 107 | 108 | 109 | zero | 110 | 111 | 112 | 113 |
| 11 | zero | zero | zero | zero | zero | zero | zero | zero | zero | zero | 100 | 101 | 102 | 103 | 104 | 105 | 106 | 107 | 108 | 109 | zero | 110 | 111 | 112 | 113 | 114 |
| 12 | zero | 100 | 101 | 102 | 103 | 104 | 105 | 106 | 107 | 108 | 109 | zero | 110 | 111 | 112 | 113 | 114 | 115 | 116 | 117 | 118 | 119 | zero | 120 | 121 | 122 |
| 13 | 100 | 101 | 102 | 103 | 104 | 105 | 106 | 107 | 108 | 109 | zero | 110 | 111 | 112 | 113 | 114 | 115 | 116 | 117 | 118 | 119 | zero | 120 | 121 | 122 | 123 |
| 14 | 101 | 102 | 103 | 104 | 105 | 106 | 107 | 108 | 109 | zero | 110 | 111 | 112 | 113 | 114 | 115 | 116 | 117 | 118 | 119 | zero | 120 | 121 | 122 | 123 | 124 |
| 15 | zero | 110 | 111 | 112 | 113 | 114 | 115 | 116 | 117 | 118 | 119 | zero | 120 | 121 | 122 | 123 | 124 | 125 | 126 | 127 | 128 | 129 | zero | 130 | 131 | 132 |
| 16 | 110 | 111 | 112 | 113 | 114 | 115 | 116 | 117 | 118 | 119 | zero | 120 | 121 | 122 | 123 | 124 | 125 | 126 | 127 | 128 | 129 | zero | 130 | 131 | 132 | 133 |
| 17 | 111 | 112 | 113 | 114 | 115 | 116 | 117 | 118 | 119 | zero | zero | 121 | 122 | 123 | 124 | 125 | 126 | 127 | 128 | 129 | zero | 130 | 131 | 132 | 133 | 134 |
| 18 | zero | zero | zero | zero | zero | zero | zero | zero | zero | zero | zero | zero | 200 | 201 | 202 | 203 | 204 | 205 | 206 | 207 | 208 | 209 | zero | 210 | 211 | 212 |
| 19 | zero | zero | zero | zero | zero | zero | zero | zero | zero | zero | zero | 200 | 201 | 202 | 203 | 204 | 205 | 206 | 207 | 208 | 209 | zero | 210 | 211 | 212 | 213 |
| 20 | zero | zero | zero | zero | zero | zero | zero | zero | zero | zero | 200 | 201 | 202 | 203 | 204 | 205 | 206 | 207 | 208 | 209 | zero | 210 | 211 | 212 | 213 | 214 |
| 21 | zero | 200 | 201 | 202 | 203 | 204 | 205 | 206 | 207 | 208 | 209 | zero | 210 | 211 | 212 | 213 | 214 | 215 | 216 | 217 | 218 | 219 | zero | 220 | 221 | 222 |
| 22 | 200 | 201 | 202 | 203 | 204 | 205 | 206 | 207 | 208 | 209 | zero | 210 | 211 | 212 | 213 | 214 | 215 | 216 | 217 | 218 | 219 | zero | 220 | 221 | 222 | 223 |
| 23 | 201 | 202 | 203 | 204 | 205 | 206 | 207 | 208 | 209 | zero | 210 | 211 | 212 | 213 | 214 | 215 | 216 | 217 | 218 | 219 | zero | 220 | 221 | 222 | 223 | 224 |
| 24 | zero | 210 | 211 | 212 | 213 | 214 | 215 | 216 | 217 | 218 | 219 | zero | 220 | 221 | 222 | 223 | 224 | 225 | 226 | 227 | 228 | 229 | zero | 230 | 231 | 232 |
| 25 | 210 | 211 | 212 | 213 | 214 | 215 | 216 | 217 | 218 | 219 | zero | 220 | 221 | 222 | 223 | 224 | 225 | 226 | 227 | 228 | 229 | zero | 230 | 231 | 232 | 233 |
| 26 | 211 | 212 | 213 | 214 | 215 | 216 | 217 | 218 | 219 | zero | 220 | 221 | 222 | 223 | 224 | 225 | 226 | 227 | 228 | 229 | zero | 230 | 231 | 232 | 233 | 234 |

1422
1424
$1434_0$
$1434_1$
$1434_2$
1435
1436
1428a
1428b
1428c
1428d
1428e
1428f
1428g
1428h
1428i
$1432_1$
$1432_2$
$1432_3$
1430a
1426a
1430d
1426d
1426g
1430g
1430b
1426b
1430e
1426e
1426h
1430h
1426c
1430c
1426f
1430f
1426i
1430i

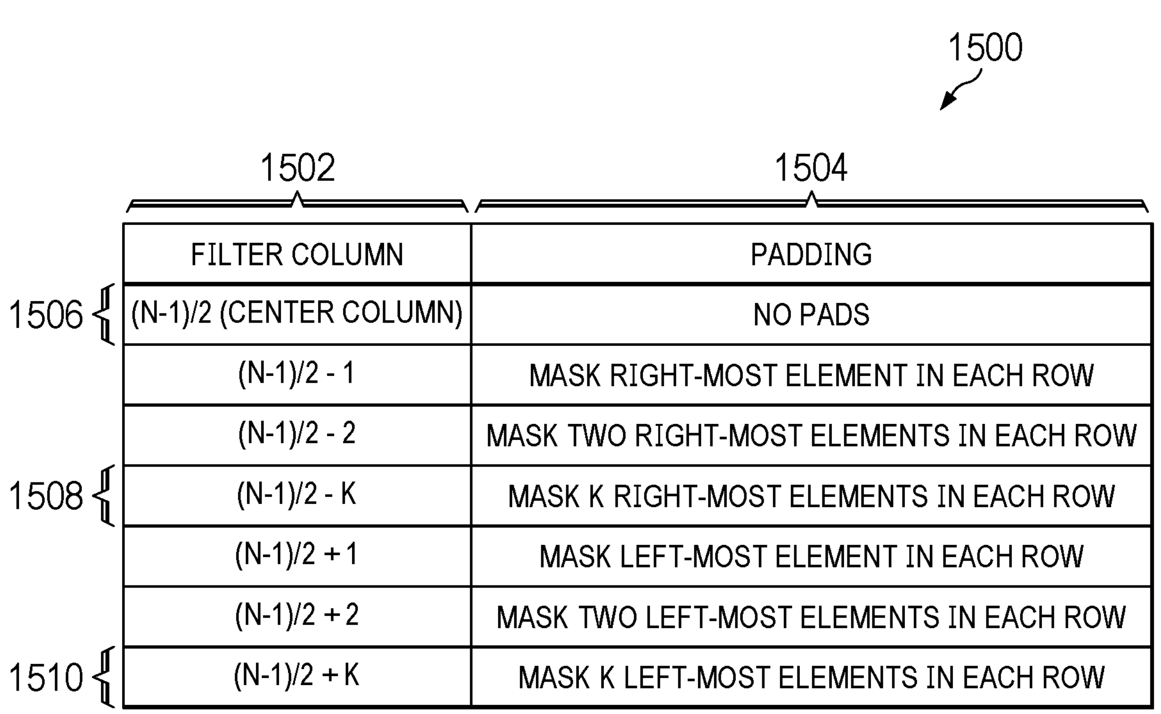

| FILTER COLUMN | PADDING |
|---|---|
| (N-1)/2 (CENTER COLUMN) | NO PADS |
| (N-1)/2 - 1 | MASK RIGHT-MOST ELEMENT IN EACH ROW |
| (N-1)/2 - 2 | MASK TWO RIGHT-MOST ELEMENTS IN EACH ROW |
| (N-1)/2 - K | MASK K RIGHT-MOST ELEMENTS IN EACH ROW |
| (N-1)/2 + 1 | MASK LEFT-MOST ELEMENT IN EACH ROW |
| (N-1)/2 + 2 | MASK TWO LEFT-MOST ELEMENTS IN EACH ROW |
| (N-1)/2 + K | MASK K LEFT-MOST ELEMENTS IN EACH ROW |

| FILTER COLUMN | PADDING |
|---|---|
| N/2 (CENTER COLUMN) | NO PADS |
| (N/2) - 1 | MASK RIGHT-MOST ELEMENT IN EACH ROW |
| (N/2) - 2 | MASK TWO RIGHT-MOST ELEMENTS IN EACH ROW |
| (N/2) - K | MASK K RIGHT-MOST ELEMENTS IN EACH ROW |
| (N/2) + 1 | MASK LEFT-MOST ELEMENT IN EACH ROW |
| (N/2) + 2 | MASK TWO LEFT-MOST ELEMENTS IN EACH ROW |
| (N/2) + K | MASK K LEFT-MOST ELEMENTS IN EACH ROW |

| FILTER COLUMN | PADDING |
|---|---|
| (N-2)/2 (CENTER COLUMN) | NO PADS |
| (N/2) - 1 | MASK RIGHT-MOST ELEMENT IN EACH ROW |
| (N/2) - 2 | MASK TWO RIGHT-MOST ELEMENTS IN EACH ROW |
| (N/2) - K | MASK K RIGHT-MOST ELEMENTS IN EACH ROW |
| (N/2) + 1 | MASK LEFT-MOST ELEMENT IN EACH ROW |
| (N/2) + 2 | MASK TWO LEFT-MOST ELEMENTS IN EACH ROW |
| (N/2) + K | MASK K LEFT-MOST ELEMENTS IN EACH ROW |

| FILTER PIXEL | ROW 1 | | | | | | | | | | ROW 2 | | | | | | | | | | ROW 3 | |
|---|---|---|---|---|---|---|---|---|---|---|---|---|---|---|---|---|---|---|---|---|---|---|
| COL -6 | (1,0) | (1,1) | (1,2) | (1,3) | | | | | | | (2,0) | (2,1) | (2,2) | (2,3) | | | | | | | (3,0) | (3,1) |
| COL -5 | (1,0) | (1,1) | (1,2) | (1,3) | (1,4) | | | | | | (2,0) | (2,1) | (2,2) | (2,3) | (2,4) | | | | | | (3,0) | (3,1) |
| COL -4 | (1,0) | (1,1) | (1,2) | (1,3) | (1,4) | (1,5) | | | | | (2,0) | (2,1) | (2,2) | (2,3) | (2,4) | (2,5) | | | | | (3,0) | (3,1) |
| COL -3 | (1,0) | (1,1) | (1,2) | (1,3) | (1,4) | (1,5) | (1,6) | | | | (2,0) | (2,1) | (2,2) | (2,3) | (2,4) | (2,5) | (2,6) | | | | (3,0) | (3,1) |
| COL -2 | (1,0) | (1,1) | (1,2) | (1,3) | (1,4) | (1,5) | (1,6) | (1,7) | | | (2,0) | (2,1) | (2,2) | (2,3) | (2,4) | (2,5) | (2,6) | (2,7) | | | (3,0) | (3,1) |
| COL -1 | (1,0) | (1,1) | (1,2) | (1,3) | (1,4) | (1,5) | (1,6) | (1,7) | (1,8) | | (2,0) | (2,1) | (2,2) | (2,3) | (2,4) | (2,5) | (2,6) | (2,7) | (2,8) | | (3,0) | (3,1) |
| COL 0 | (1,0) | (1,1) | (1,2) | (1,3) | (1,4) | (1,5) | (1,6) | (1,7) | (1,8) | (1,9) | (2,0) | (2,1) | (2,2) | (2,3) | (2,4) | (2,5) | (2,6) | (2,7) | (2,8) | (2,9) | (3,0) | (3,1) |
| COL +1 | | (1,1) | (1,2) | (1,3) | (1,4) | (1,5) | (1,6) | (1,7) | (1,8) | (1,9) | | (2,1) | (2,2) | (2,3) | (2,4) | (2,5) | (2,6) | (2,7) | (2,8) | (2,9) | | (3,1) |
| COL +2 | | | (1,2) | (1,3) | (1,4) | (1,5) | (1,6) | (1,7) | (1,8) | (1,9) | | | (2,2) | (2,3) | (2,4) | (2,5) | (2,6) | (2,7) | (2,8) | (2,9) | | |
| COL +3 | | | | (1,3) | (1,4) | (1,5) | (1,6) | (1,7) | (1,8) | (1,9) | | | | (2,3) | (2,4) | (2,5) | (2,6) | (2,7) | (2,8) | (2,9) | | |
| COL +4 | | | | | (1,4) | (1,5) | (1,6) | (1,7) | (1,8) | (1,9) | | | | | (2,4) | (2,5) | (2,6) | (2,7) | (2,8) | (2,9) | | |
| COL +5 | | | | | | (1,5) | (1,6) | (1,7) | (1,8) | (1,9) | | | | | | (2,5) | (2,6) | (2,7) | (2,8) | (2,9) | | |
| COL +6 | | | | | | | (1,6) | (1,7) | (1,8) | (1,9) | | | | | | | (2,6) | (2,7) | (2,8) | (2,9) | | |

```
       0   1111111111111111111111111111111111111111111111111111111111111111
       1   1111111111111111111111111111111111111111111111111111111111111111
       2   0101010101010101010101010101010101010101010101010101010101010101
       3   1001001001001001001001001001001001001001001001001001001001001001
1818 { 4   0001000100010001000100010001000100010001000100010001000100010001
       5   0001000010000100001000010000100001000010000100001000010000100001
       6   0001000001000001000001000001000001000001000001000001000001000001
       7   1000000100000010000001000000100000010000001000000100000010000001
       8   0000000100000001000000010000000100000001000000010000000100000001
1818 { 9   1000000001000000001000000001000000001000000001000000001000000001
      10   0001000000000100000000010000000001000000000100000000010000000001
      11   0000000010000000000100000000001000000000010000000000100000000001
      12   0001000000000001000000000001000000000001000000000001000000000001
      13   0000000000010000000000001000000000000100000000000010000000000001
      14   0000000100000000000001000000000000010000000000000100000000000001
      15   0001000000000000001000000000000001000000000000001000000000000001
       ⋮                                   ⋮
      62   0100000000000000000000000000000000000000000000000000000000000001
      63   1000000000000000000000000000000000000000000000000000000000000001
      64   0000000000000000000000000000000000000000000000000000000000000001
```

ZERO PADDING FOR CONVOLUTIONAL NEURAL NETWORKS

TECHNICAL FIELD

This application relates generally to convolutional neural networks, and more particularly to zero padding of data read from storage memory to operational memory for use in convolutional neural networks.

BACKGROUND

Deep learning is a class of machine learning algorithms used for tasks such as recognizing features in raw input image data. Image data can include, for example, camera pixel data, electron backscatter data, or radar or light detection and ranging (LIDAR) sensor data. Resulting feature and object recognition can be used to support security systems, automated robotics, self-driving vehicles, watermark recognition, inventory management, semiconductor manufacturing, and other imaging-sensitive applications. Deep learning techniques include convolutional neural networks and transformers.

A system on a chip (SOC) is an integrated circuit (IC) with multiple functional blocks, such as one or more processor cores, memory, and input and output, on a single die.

Hierarchical memory moves data and instructions between memory blocks with different read/write response times for a corresponding processor core, such as a central processing unit (CPU) or a digital signal processor (DSP). For example, memories that are more local to respective processor cores will typically have lower response times. Hierarchical memories include cache memory systems with multiple levels, such as L1 and L2, in which different levels describe different degrees of locality or different average response times of the cache memories to respective processor cores.

SUMMARY

In described examples, an integrated circuit (IC) includes a matrix multiplication accelerator including a first memory, a second memory, and a memory controller. The second memory is configured to store multiple rows of an input feature map on a single line of cells of the memory, and to store a filter kernel. The memory controller reads multiple contiguous memory vectors of the second memory, different ones of the contiguous memory vectors corresponding to different portions of the input feature map. The memory controller also replaces (with padding zeroes) values of respective ones of the contiguous memory vectors. The number and location of replaced values are selected in response to a column index of an element of the filter kernel in response to which the respective contiguous memory vector is read. Zero padded contiguous memory vectors are written to the first memory.

BRIEF DESCRIPTION OF THE DRAWINGS

FIG. 9 shows a diagram illustrating example contents of the MMA accelerator memory of FIG. 1 after reading the unified input feature map matrix of FIG. 8B and writing it into the MMA accelerator memory.

FIG. 10 shows an example diagram of the input feature maps of FIG. 8A padded by zeroes to form zero padded input feature maps.

FIG. 12 shows a diagram illustrating prior art example contents of an MMA accelerator memory after reading feature map data from an L2 cache and writing it into the MMA accelerator memory.

FIG. 15A shows a table with example masking rule entries that positionally characterize zero padding as noted above, that is, by describing zero padding locations relative to attributes of contiguous non-zero padded memory vectors read from L2 cache and written into the MMA accelerator memory, and in order to prepare for convolution according to a convolution layer of the CNN of FIG. 2.

FIG. 15B shows a table with example masking rule entries that positionally characterize zero padding as noted above, that is, by describing zero padding locations relative to attributes of contiguous non-zero padded memory vectors read from L2 cache and written into the MMA accelerator memory, and in order to prepare for convolution according to a convolution layer of the CNN of FIG. 2.

FIG. 15C shows a table with example masking rule entries that positionally characterize zero padding as noted above, that is, by describing zero padding locations relative to attributes of contiguous non-zero padded memory vectors read from L2 cache and written into the MMA accelerator memory, and in order to prepare for convolution according to a convolution layer of the CNN of FIG. 2.

FIG. 16 shows a diagram illustrating example locations of zero padding applied to contiguous non-zero padded memory vectors read from L2 cache and written into the MMA accelerator memory to prepare for convolution according to a convolution layer of the CNN of FIG. 2.

DETAILED DESCRIPTION

Figure 1:
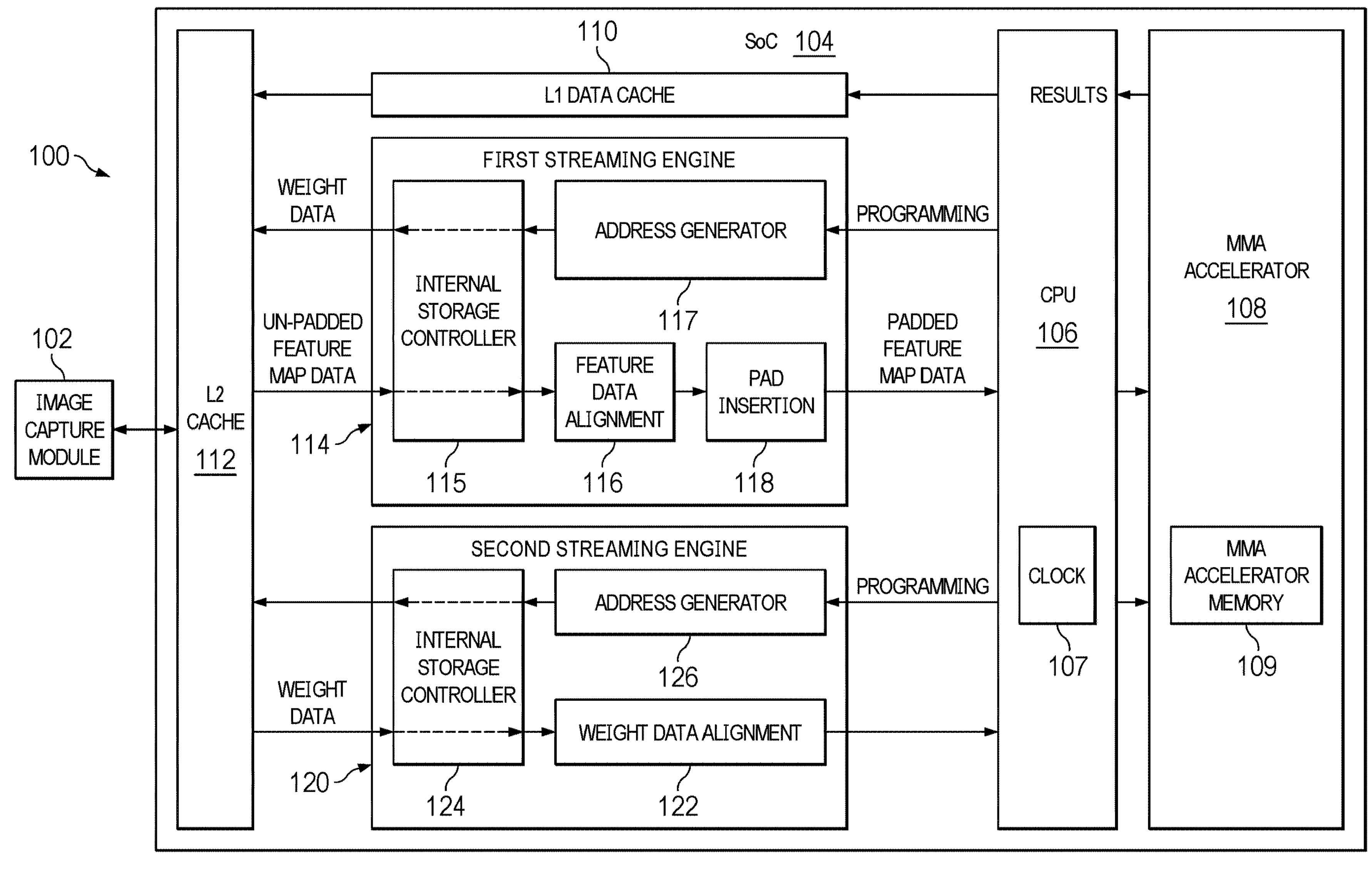
FIG. 1 shows a block diagram of an example image recognition system.

Some example deep learning models, such as convolutional neural networks (CNN), can be efficiently implemented by transforming the convolution operation into a matrix times matrix formulation and then using matrix multiplication to process layers. For example, CNNs can use matrix multiplication to sequentially process input data tensors called feature maps. Feature maps are processed in serially connected convolutional layers using sets of weights and biases; different sets of weights and biases correspond to different convolutional layers. (Serially connected layers can also include non-convolutional layers.) This process can be accelerated using hardware specifically designed to efficiently perform matrix multiplication operations, such as matrix multiply and accumulate (MMA) operations.

To facilitate hardware acceleration, a CNN process includes reading data from a storage memory, such as an L2 cache, into a memory of an MMA accelerator. Reading memory vectors composed of contiguous bytes (referred to herein as contiguous memory vectors) from L2 cache at a time helps to speed up the CNN process. The read values in individual contiguous memory vectors constitute data used to perform matrix operations with respect to a corresponding element of a number $n^{th}$ filter kernel of each set of filter kernels to be processed in a convolutional layer. A contiguous memory vector corresponds to a continuous, sequentially addressed series of bytes (of memory cells) with a specified starting memory address and a specified memory range length. In some examples, a contiguous memory vector (up to an architecture-dependent size in bytes) can be read in a single cycle, whereas a similarly sized set of bytes randomly distributed through memory may take multiple cycles to read and may require additional time and processing to organize.

However, in some examples, a contiguous memory vector read can capture data entries that do not correspond to intended MMA operations that triggered that memory vector read (further explained below starting at FIG. 7). Unwanted read data can lead to spurious written data in the MMA accelerator's memory. Preventing these spurious data entries from causing the MMA accelerator to perform unwanted operations, or subtracting out unwanted portions of MMA products caused by unwanted operations, wastes clock cycles, and increases software or hardware complexity.

Zero padding feature maps prior to applying MMA operations to those feature maps serves multiple purposes (listed here and further described below). Zero padding avoids reduction in feature map matrix dimensions from layer to layer, enables windowing applied using filter matrices to more completely capture edge values of feature maps, and facilitates reduction of spurious data entries in the MMA accelerator's memory. Zero padding on the fly—during the cache read/MMA write process—can be used to further (in some examples, completely) avoid spurious data entries in the MMA accelerator's memory, and to avoid use of L2 cache space for padding zeroes. This saves clock cycles, lowers software complexity, reduces memory usage, decreases power cost, and in some examples, saves device area.

FIG. 1 shows a block diagram of an example image recognition system 100. An image capture module 102 is connected to output to, and to be controlled by, an image processing SoC 104. The image processing SoC 104 includes a central processing unit (CPU) 106 with a clock 107, an MMA accelerator 108 with an MMA accelerator memory 109, an L1 data cache (LiD) 110, an L2 cache 112, a first streaming engine 114, and a second streaming engine 120. The first streaming engine 114 includes an internal storage controller 115, an address generator 117, a feature data alignment block 116, and a pad insertion block 118. The second streaming engine 120 includes an internal storage controller 124, an address generator 126, and a weight data alignment block 122. A system bus the CPU 106 uses to transmit control signals to the above-listed functional blocks, coupling the CPU 106 to the controlled functional blocks, is not shown.

First and second streaming engines 114 and 120 are memory controllers controlling transfer of feature data and weight data (respectively) to the MMA accelerator memory 109 via the CPU 106 using a datapath that bypasses the LiD cache 110. Accordingly, the LiD cache 110 is not called (for example, to seek a cache hit) when a contiguous memory vector corresponding to an input feature map is being read from L2 cache 112, and the contiguous memory vector is not written to the LiD cache 110 after being read from L2 cache 112. For clarity, FIG. 1 does not show some cache controllers, instruction cache(s), and certain other functional blocks that are included in the image processing IC 104.

The CPU 106 transmits control signals to the image capture module 102. In response, the image capture module 102 uses photons, electrons, ions, gaseous or liquid medium pressure waves, or other particles or waves to capture environmental image data. The image capture module 102 transmits this raw image data to the SoC 104, which receives the data, arranges it as feature maps, and stores it in the L2 cache 112 for processing. The L2 cache 112 also stores weights and biases used to convolve the feature maps. Biases are values added to respective elements of matrices output as MMA results to adjust convolution products of corresponding convolution layers. For clarity, biases are not further discussed herein, as it is straightforward to incorporate biases into disclosed convolution processes.

Under programmatic control of the CPU 106, feature map values are read out of the L2 cache 112 one contiguous memory vector at a time, and are transmitted to the MMA accelerator 108 via the first streaming engine 114. The address generator provides 117 addresses to control L2 cache 112 reads, and the internal storage controller 115 provides local storage (memory) for incoming feature map data. The feature data alignment block 116 retrieves data from the internal storage controller 115 and aligns feature map data so that it will be loaded into correct locations in the MMA accelerator memory 109. The pad insertion block 118 of the first streaming engine 114 pads the aligned feature map data with zeroes or another null value, then passes the zero padded feature map data to the CPU 106, which causes the zero padded feature map data to be stored in the MMA accelerator memory 109 of the MMA accelerator 108.

Weight data is also read from the L2 cache 112, using the respective address generator 126 and internal storage controller 124 of the second streaming engine 120, and is passed to the weight data alignment block 122. The weight data alignment block 122 aligns the weight data (functioning similarly to the feature data alignment block 116), and the second streaming engine 120 passes the aligned weight data to the MMA accelerator 108 via the CPU 106. Accordingly, feature map data and weight data are passed from the L2 cache 112 to the MMA accelerator 108 while bypassing the LiD cache 110. In some examples, LiD cache 110 misses are assumed with respect to feature map data and weight data. (In some examples, communications between the CPU 106 and the L1 and L2 caches 110 and 112 are bidirectional for purposes other than those described herein.) After the MMA accelerator 108 processes the zero padded feature map data, the MMA accelerator 108 passes processing results back to the CPU 106, which forwards the results, via the LiD cache 110, to the L2 cache 112.

Figure 2:
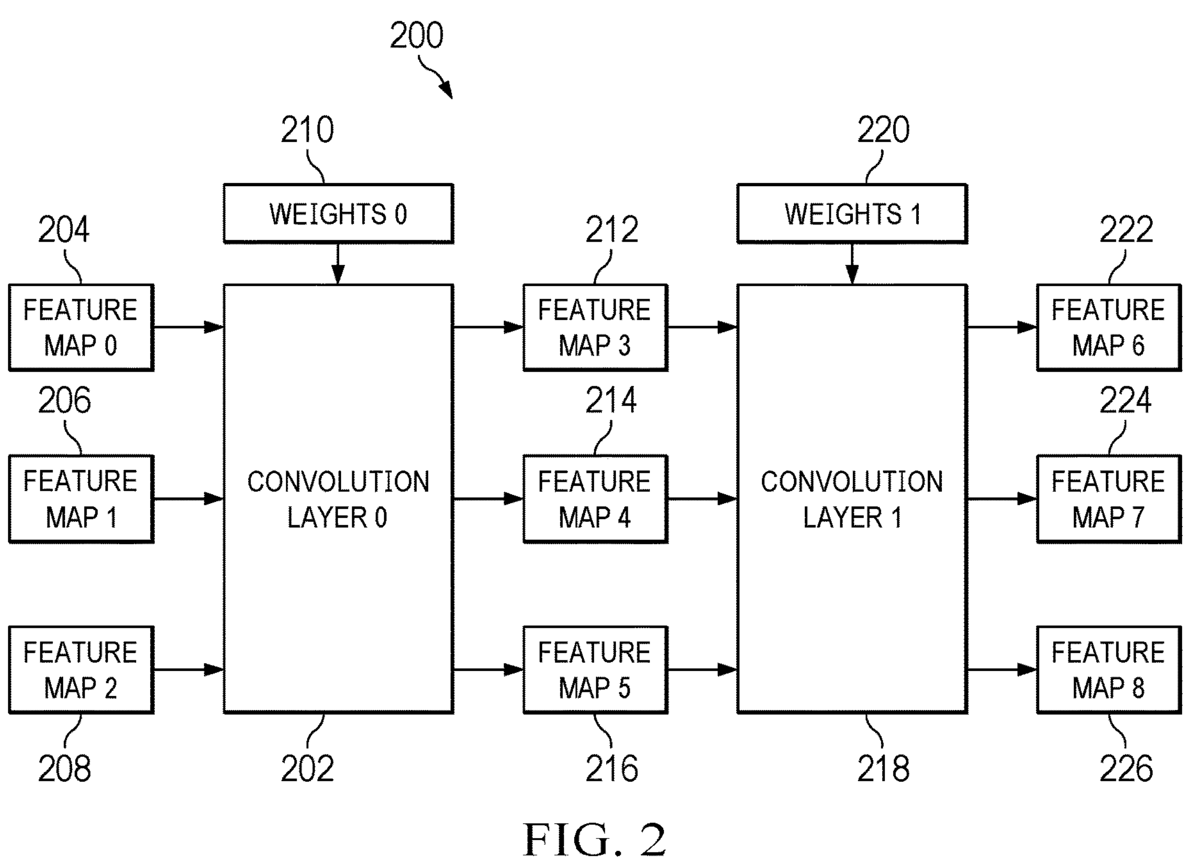
FIG. 2 shows a block diagram of an example CNN.

FIG. 2 shows a block diagram of an example CNN 200. A first convolution layer (convolution layer 0) 202 receives a tensor comprising input data, which is image data captured by the image capture module 102. (Numbering of items such as layers, matrices, matrix elements, and memory cells starts with zero, herein.) In some examples, input data has previously been processed by other layers of the CNN 200 layers, such as other convolution layers; convolution layer 0 202 may be a first convolution layer of the CNN 200, or a later convolution layer of the CNN. The input data tensor for convolution layer 0 202 comprises a first feature map (feature map 0) 204, a second feature map (feature map 1) 206, and a third feature map (feature map 2) 208. Convolution layer 0 202 also receives a first set of trained weights (weights 0) 210. Weights 0 210 are shared across the input space of convolution layer 0 202 and are used by convolution layer 0 202 to process feature maps 0, 1, and 2 204, 206, and 208. Weights are determined by, for example, training the CNN 200 using a test input data set. A set of weights corresponding to a layer is arranged into matrices comprising portions of the set of weights, called filter kernels, that are convolved with corresponding input feature maps to produce output feature maps of the layer. Filter kernels window feature maps, producing smaller matrices that are multiplied with respective filter kernels to produce intermediate outputs that are added together to generate output feature maps; this is further described with respect to FIGS. 4A, and 4B.

Convolution layer 0 202 performs convolution on feature maps 0, 1, and 2 204, 206, and 208, using weights 0 210 to generate a fourth feature map (feature map 3) 212, a fifth feature map (feature map 4) 214, and a sixth feature map (feature map 5) 216. Convolution is performed using matrix operations, as described below with respect to FIGS. 3, 4A, and 4B.

Feature maps 3, 4, and 5 212, 214, and 216, which together form an output tensor of convolution layer 0 202, are an input tensor for a second convolution layer (convolution layer 1) 218. Convolution layer 1 218 also receives a second set of weights (weights 1) 220. Convolution layer 1 218 performs matrix operations on feature maps 3, 4, and 5 212, 214, and 216, using weights 1 220, to generate a seventh feature map (feature map 6) 222, an eighth feature map (feature map 7) 224, and a ninth feature map (feature map 8) 226. Feature maps 6, 7, and 8 222, 224, and 226 together form an output tensor of convolution layer 1 218. A variable number of convolution layers and other layers can be used in the CNN 200. Additional layers and operations can be used in a CNN, such as pooling layers, a non-linear activation function (such as tanh, the sigmoid function, or the rectified linear unit (ReLu) function), and input and output layers (not shown).

Figure 3:
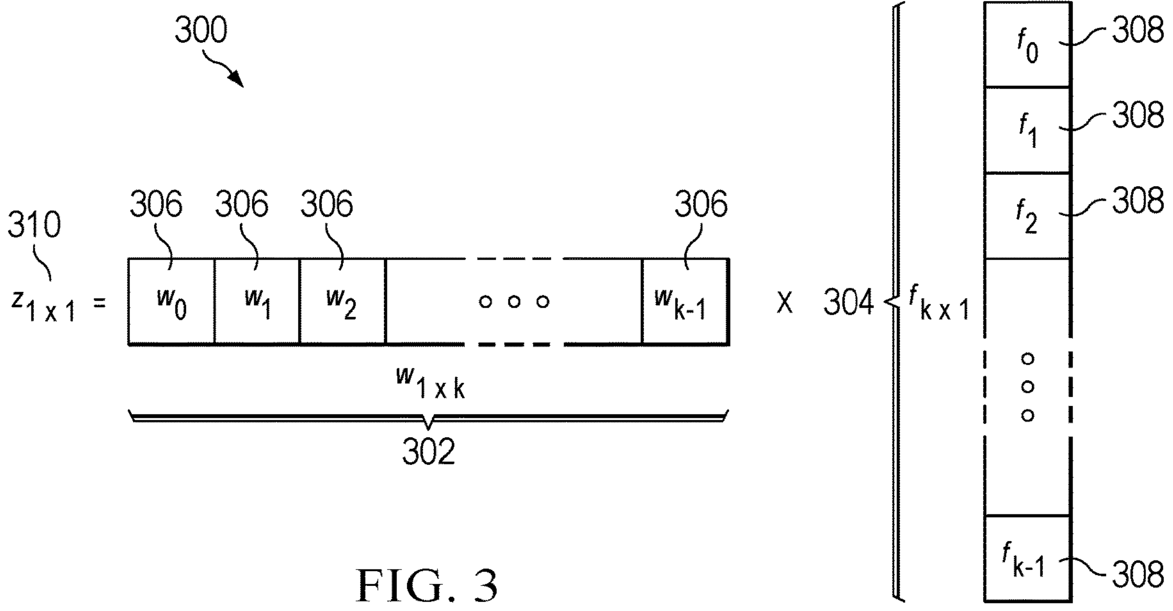
FIG. 3 shows a diagram illustrating a dot product of an example weights vector (w) with an example feature vector (f).

FIG. 3 shows a diagram 300 illustrating a dot product of an example weights vector (w) 302 with an example feature vector (f) 304. The weights vector (w) 302 has dimensions 1×k (for an integer k, corresponding to one row and k columns) and includes individual weights values 306 $w_0$, $w_1$, $w_2$, . . . , and $w_{k-1}$. The feature vector (f) 304 has dimensions kx1 and includes individual feature values 308 $f_0$, $f_1$, $f_2$, . . . , and $f_{k-1}$. The dot product of the weights vector (w) 302 with the feature vector (f) 304 produces an output (z) 310 (a multiplication sign is used instead of a dot product symbol in FIG. 3 for visual clarity).

A CNN convolution operation can be broken down into smaller component mathematical operations. Some of these component operations can be represented as dot products of weight vectors (w) 302 (dimensions 1×k) with feature vectors (f) 304 (dimensions kx1) to produce an output (z) 310 with dimensions 1×1, as shown in Equation 1:

$$z_{1\times 1} = w_{1\times k} \cdot f_{k\times 1} \quad \text{Equation 1}$$

(A 1×1 bias term can be added to the 1×1 dot product to produce the output (z) 310.) Equation 1 can be implemented solely using multiply-accumulate (MAC) operations of the form $a_n=a_{n-1}+b\times c$, where $a_n$ accumulates the result of a number $n^{th}$ MAC operation in a series of MAC operations. Matrix multiplication can be expressed as a set of dot products; accordingly, matrix multiplication can be performed using a series of MAC operations. This means that each input feature map and each filter kernel of a corresponding convolution layer are can be convolved using the MMA operations of the MMA accelerator 108 to perform the MMA operation portions of convolution according to the corresponding convolution layer.

Figure 4:
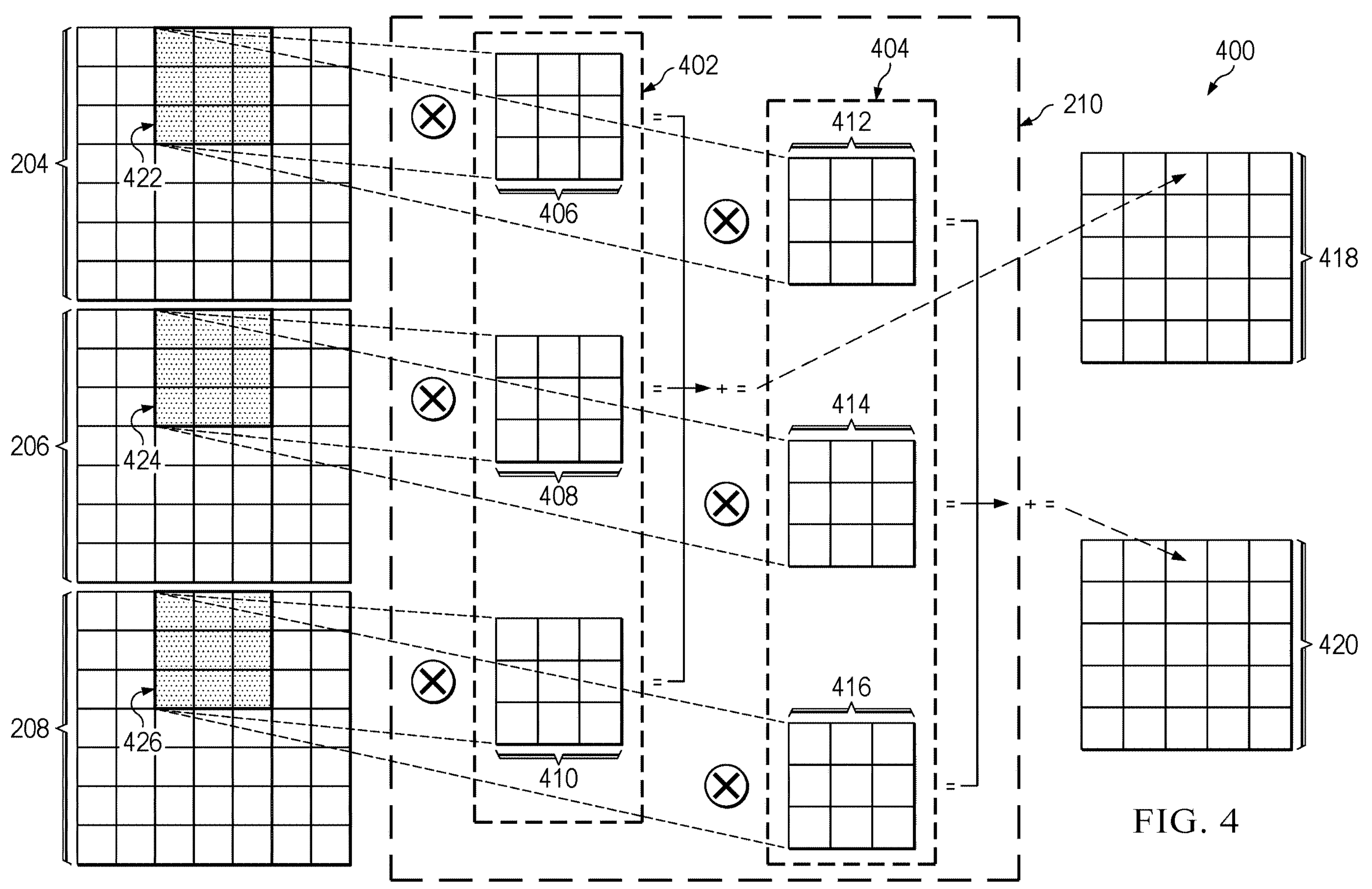
FIG. 4 shows a diagram illustrating convolution of example input feature maps 0, 1, and 2, with example weights 0.

FIG. 4 shows a diagram 400 illustrating convolution of example feature maps 0, 1, and 2 204, 206, and 208, with example weights 0 210. Weights 0 210 includes two sets of filter kernels (matrices of weight values), which are a first set of filter kernels 402 and a second set of filter kernels 404. Each of the first and second sets of filter kernels 402 and 404 includes three filter kernels, each of which has dimensions 3×3. Accordingly, the first set of filter kernels 402 includes filter kernel (0,0) 406 (number of the filter kernel within a filter kernel set, number of the filter kernel set), filter kernel (1,0) 408, filter kernel (2,0) 410, and the second set of filter kernels 404 includes filter kernel (0,1) 412, filter kernel (1,1) 414, and filter kernel (2,1) 416. Each filter kernel in a set of filter kernels 402 or 404 corresponds to a different one of the feature maps 204, 206, or 208. Feature map 0 204 corresponds to filter kernels (0,0) 406 and (0,1) 412. Feature map 1 206 corresponds to filter kernels (1,0) 408 and (1,1) 414. Feature map 2 208 corresponds to filter kernels (2,0) 410 and (2,1) 416. Together, feature maps 0, 1, and 2 204, 206, and

208 and the first set of filter kernels 402 are used to generate a first output feature map (feature map 3) 418; and together, feature maps 0, 1, and 2 204, 206, and 208 and the second set of filter kernels 404 are used to generate a second output feature map (feature map 4) 420. (Feature maps 3 and 4 (418 and 420) can be viewed as an examples of feature maps 3 and 4 (212 and 214) of FIG. 2. Adding a feature map 5 to FIG. 4 would correspond to adding a third set of filter kernels 402.)

Feature maps 204, 206, and 208 are windowed by filter kernels 406, 408, 410, 412, 414, and 416, so that each portion of a feature map 204, 206, or 208 of the same dimensions as the filter kernels 406, 408, 410, 412, 414, or 416—in the diagram, each 3×3 portion of a feature map 204, 206, or 208—is extracted from the respective feature map 204, 206, or 208. These portions are indexed by the element location in the respective feature map 204, 206, or 208 of the upper-left corner of the windowed portion. Herein, the upper-left corner of a matrix is considered element (0,0). The example windows shown in the diagram 400 are the window (0,2) 422 (first row, third column) of feature map 0 204, the window (0,2) 424 of feature map 1 206, and the window (0,2) 426 of feature map 2 208. Windows (0,2) 422, 424, and 426 of dimensions 3×3 include elements (0,2), (0,3), (0,4), (1,2), (1,3), (1,4), (2,2), (2,3), and (2,4) in each respective input feature map 204, 206, and 208. In another example illustrating window format, shifting the index used to generate windows two elements to the right and three elements down from (0,2) corresponds to (3,4) windows (fourth row, fifth column). Windows (3,4) of dimensions 3×3 include elements (3,4), (3,5), (3,6), (4,4), (4,5), (4,6), (5,4), (5,5), and (5,6).

Convolution of feature maps 0, 1, and 2 204, 206, and 208 includes determining the dot product between each windowed portion of each feature map 204, 206, or 208 and each corresponding filter kernel 406, 408, and 410 or 412, 414, and 416 of a set of filter kernels 402 or 404. To do this, the two-dimensional dot product is determined for each window corresponding to an index (such as (0,2) or (3,4)) and each corresponding filter kernel 406, 408, or 410 of the first set of filter kernels 402. (The x-in-a-circle sign is used here as the symbol for two-dimensional convolution.) Accordingly, for the window (0,2) 422 of feature map 0 204, the two-dimensional dot product is determined for the window (0,2) 422 and the filter kernel (0,0) 406 by multiplying each element of the window (0,2) 422 by the element in the same location of the filter kernel (0,0) 406, and adding the resulting products. In other words, for a row index x and a column index y, each element (x,y) of the window (0,2) 422 is multiplied by element (x,y) of the filter kernel (0,0) 406, and the products are summed. This is repeated for windows (0,2) 424 and 426 of feature maps 1 and 2 206 and 208. The three two-dimensional dot products generated using (1) windows of feature maps 0, 1, and 2 204, 206, and 208 that have a particular index (such as (0,2) or (3,4)), and (2) the first set of filter kernels 402 (recall that there are three filter kernels per set of filter kernels 402 and 404), are added together to generate the value of an element with the particular index (the same index as the generating windows) in feature map 3 418. (The plus sign is used for clarity; it is redundant to the convolution symbol.) This is repeated for all possible window indices in feature maps 0, 1, and 2 204, 206, and 208 to generate values for all of the elements in feature map 3 418.

Similarly, the three summed dot products generated using (1) windows of feature maps 0, 1, and 2 204, 206, and 208 that have a particular index, and (2) corresponding filter kernels of the second set of filter kernels 404, are added together to generate the value of an element with the particular index in feature map 4 420. This is repeated for all possible window indices in feature maps 0, 1, and 2 204, 206, and 208 to generate values for all of the elements in feature map 4 420. Output feature maps 3 and 4 418 and 420 are smaller than input feature maps 0, 1, and 2 204, 206, and 208 because there are fewer possible window indices than there are elements in each of input feature maps 0, 1, and 2 204, 206, and 208.

Window indices are not located further to the right or further down than an index corresponding to the bottom right-hand corner of a window being located at the bottom right-hand corner of the corresponding input feature map. This corresponds to dimensions of the output feature map being reduced by one less than the respective dimensions of the filter kernel from the dimensions of an input feature map.

In the example shown in the diagram 400, windows (0,2) 422, 424, and 426 of dimensions 3×3 of feature maps 0, 1, and 2 204, 206, and 208, along with the first and second sets of filter kernels 402 and 404, are used to generate values to populate element (2,0) of feature maps 3 and 4 418 and 420. In another example (not shown), windows (3,4) of dimensions 3×3 of feature maps 0, 1, and 2 204, 206, and 208, along with the first and second sets of filter kernels 402 and 404, are used to generate values to populate element (3,4) of feature maps 3 and 4 418 and 420.

Figure 5A:
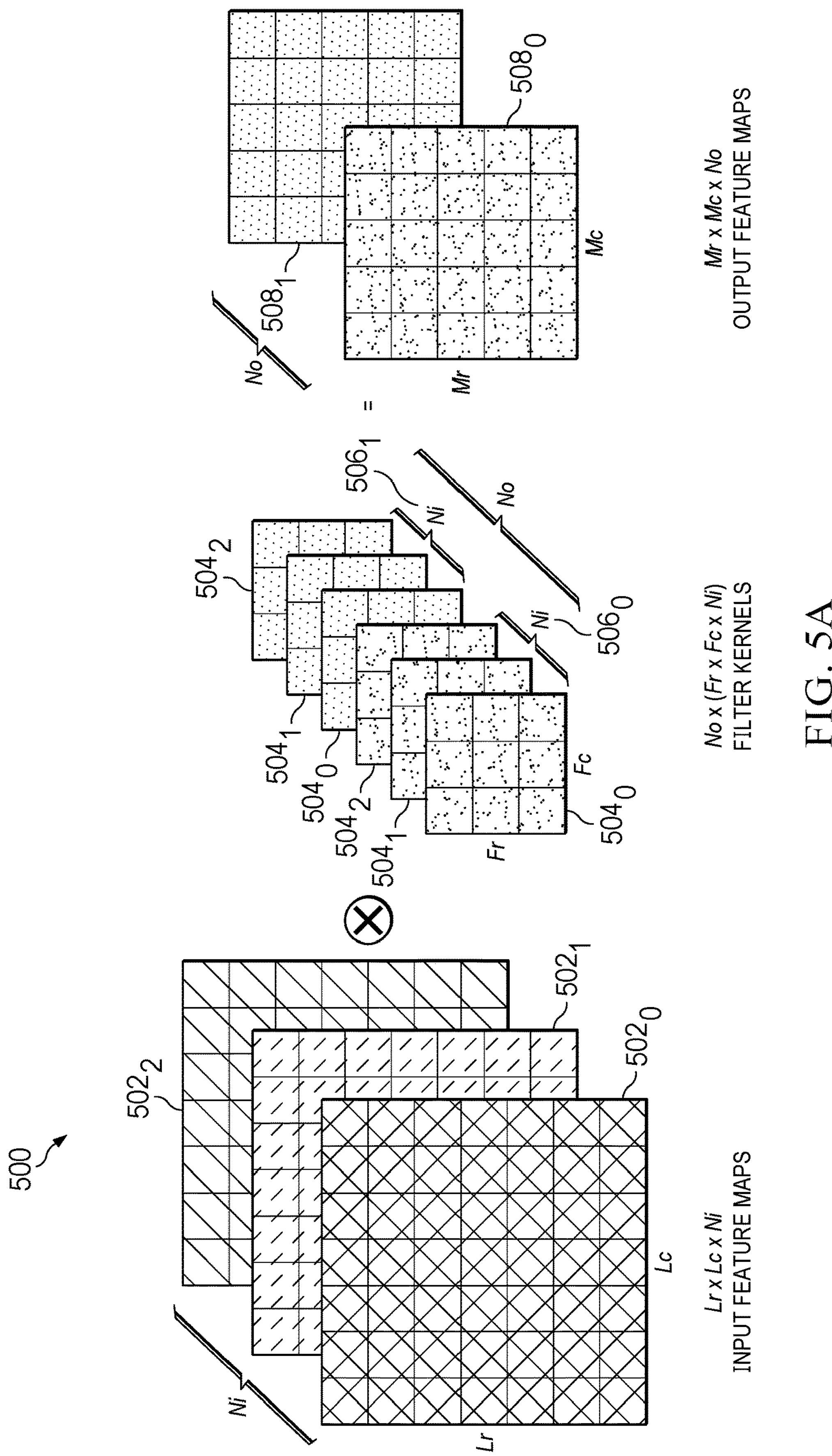
FIG. 5A shows a diagram illustrating convolution of example input feature maps, filter kernels, and output feature maps.

FIG. 5A shows a diagram 500 illustrating convolution of example input feature maps 502, filter kernels 504, and output feature maps 508. There are a number Ni (number of input feature maps) input feature maps 502, which have dimensions Lr (number of input feature map rows) by Lc (number of input feature map columns), and are numbered input feature maps $\mathbf{502}_0$, $\mathbf{502}_1$, . . . , $\mathbf{502}_{Ni-1}$. Filter kernels 504 comprise a number No (number of output feature maps) sets of filter kernels 506 that have the number Ni filter kernels 504 each. Individual sets of filter kernels 506 are numbered filter kernel sets $\mathbf{506}_0$, $\mathbf{506}_1$, . . . , $\mathbf{506}_{No-1}$, and individual filter kernels 504 within a set of filter kernels 506 are numbered filter kernels $\mathbf{504}_0$, $\mathbf{504}_1$, . . . , $\mathbf{504}_{Ni-1}$. Filter kernels 504 each have dimensions Fr (number of filter kernel rows) by Fc (number of filter kernel columns). Convolving the input feature maps 502 with the filter kernels 504 generates output feature maps 508. There are No output feature maps 508, numbered output feature maps $\mathbf{508}_0$, $\mathbf{508}_1$, . . . , $\mathbf{508}_{No-1}$, with dimensions Mr (number of output feature map rows) by Mc (number of output feature map columns). The input feature maps 502, filter kernels 504, and output feature maps 508 are arranged in three dimensions to facilitate the rearrangement shown in FIG. 5B.

Figure 5B:
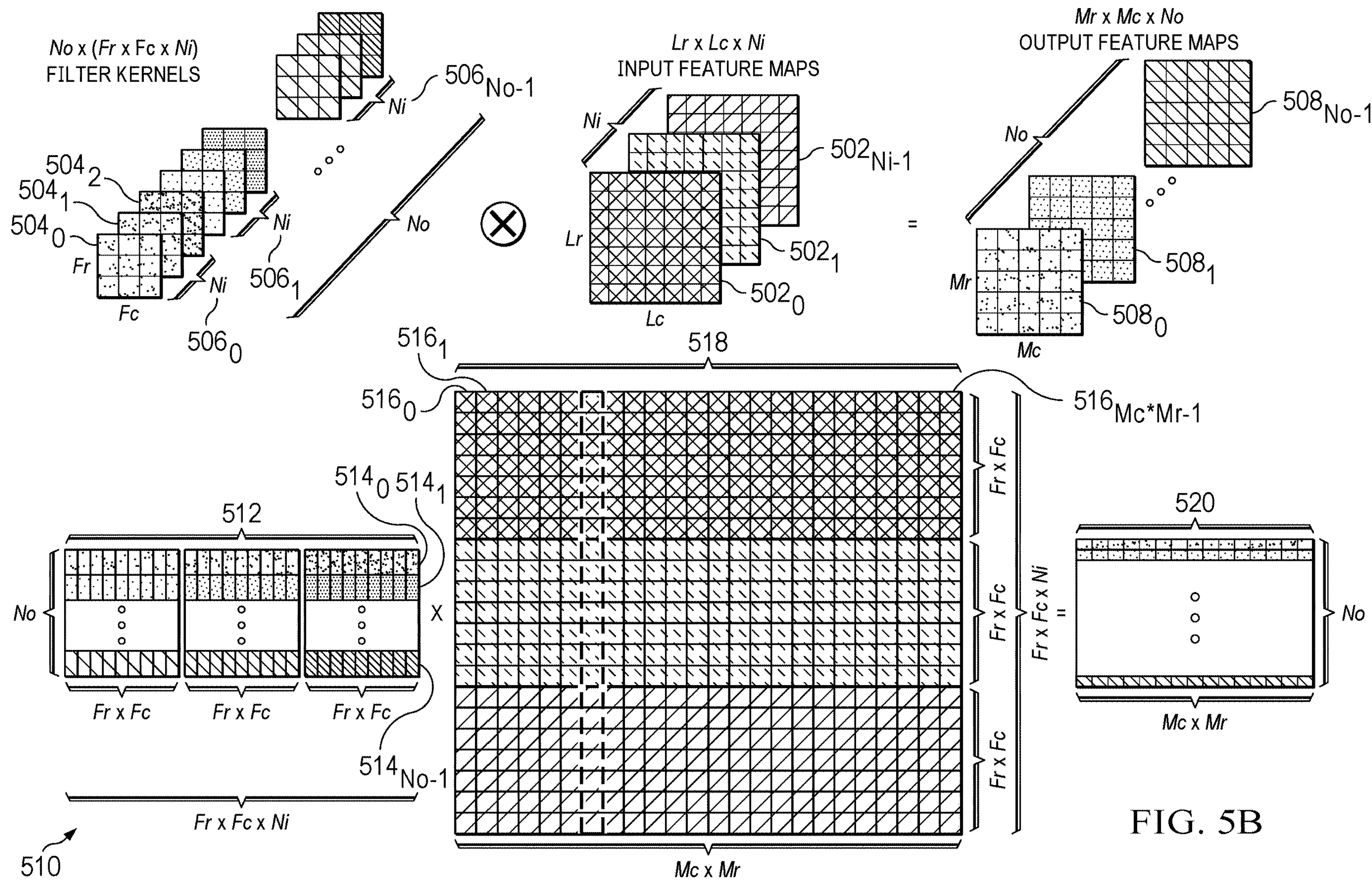
FIG. 5B shows a diagram alternatively illustrating the convolution of example input feature maps and filter kernels to form output feature maps of FIG. 5A.

FIG. 5B shows a diagram 510 alternatively illustrating the convolution of example input feature maps 502 and filter kernels 504 to form output feature maps 508 of FIG. 5A. The three-dimensional data sets of the FIG. 5A diagram 500 are rearranged to form two-dimensional data sets in the FIG. 5B diagram 510. Accordingly, the first, second, and third columns of a first filter kernel $\mathbf{504}_0$ in the first filter kernel set $\mathbf{506}_0$ (using the terminology introduced with respect to FIG. 4, filter kernel (0,0) 504) are concatenated with the first second, and third columns of each successive filter kernel 504 in the first filter kernel set $\mathbf{506}_0$ (filter kernel (1,0), filter kernel (2,0), . . . , filter kernel (Ni−1,0)), and are transposed to become a first row $\mathbf{514}_0$ of a unified filter kernel matrix 512. Rows 514 of the unified filter kernel matrix 512 are numbered $\mathbf{514}_0$, $\mathbf{514}_1$, . . . , $\mathbf{514}_{No-1}$. A number $M^{th}$ row $\mathbf{514}_N$ of the unified filter kernel matrix 512 is generated using the Ni filter kernels 504 of the $M^{th}$ filter kernel set 506.

For example, if the first column of filter kernel (0,0) 504 contains (0 1 2), the second column of filter kernel (0,0) 504 contains (3 4 5), and the third column of filter kernel (0,0) 504 contains (6 7 8), and the first column of filter kernel (1,0) 504 contains (9 10 11), then the first row 514 of the unified filter kernel matrix 512 begins (0 1 2 3 4 5 6 7 8 9 10 11). The second row 514 of the unified filter kernel matrix 512 is constructed similarly using the Ni filter kernels 504 of the second filter kernel set $\mathbf{506}_1$, the third row 516 of the unified filter kernel matrix 512 using the Ni filter kernels 504 of the third filter kernel set 5062, and so on for the No sets of filter kernels 506. The unified filter kernel matrix 512 has No rows (each row contains filter coefficients from one set of filter kernels 506) and Fr×Fc×Ni columns (the number of filter values in each set of filter kernels 506).

Similarly, for each window index of the feature maps 502, the rows of the corresponding windows are concatenated and transposed to form a column 516 of a unified input feature map matrix 518. (Unified input feature map matrices described herein are only partially shown in corresponding figures in response to space and clarity considerations.) Columns 516 of the unified input feature map matrix 518 are numbered $\mathbf{516}_0$, $\mathbf{516}_1$, . . . , $\mathbf{516}_{Mc*Mr-1}$. For example, if the first row of the window (0,0) of input feature map $\mathbf{502}_0$ (a first input feature map 502) is (0 1 2), the second row is (3 4 5), and the third row is (6 7 8), and the first row of the window (0,0) of input feature map $\mathbf{502}_1$ (a second input feature map 502) is (9 10 11), then the first column $\mathbf{516}_0$ of the unified input feature map matrix 518 begins (0 1 2 3 4 5 6 7 8 9 10 11). The unified input feature map matrix 518 has Fr×Fc×Ni rows (the number of feature values in each window multiplied by the number of input feature maps 502), and Mc×Mr columns 516 (the number of indices in each input feature map 502 that can be used to form windows, which is the same as the number of matrix elements in an output feature map 508).

The dot product of the A row $\mathbf{514}_M$ of the unified filter kernel matrix 512 with a number $N^{th}$ column $\mathbf{516}_N$ of the unified input feature map matrix 518 is equivalent to performing the convolution operation described in FIG. 4 on (1) the $M^{th}$ filter kernel set 506 used to generate the $M^{th}$ row $\mathbf{514}_M$ of the unified filter kernel matrix 512 and (2) the Ni windows (within the Ni input feature maps 502) with the index used to generate the $N^{th}$ column $\mathbf{516}_N$ of the unified input feature map matrix 518. This index is related to N and dimensions of the (unpadded by zeroes) input feature maps 502 and the filter kernels 504 by Equation 2. Mod is the modulo function. N is reduced by one in Equation 2 because indices count from zero, while N starts at one. The index is operated on by the modulus of the input feature map 502 column dimension, minus the feature kernel 504 column dimension, plus one because not every input feature map 502 element is operated on by any particular filter kernel 504 element; this is discussed further with respect to FIGS. 6 and 7.

Equation 2

$$\text{Index} = \left(\frac{(N-1)-(N-1)\text{mod}(Lc-Fc+1)}{Lc-Fc+1},\ (N-1)\text{mod}(Lc-Fc+1)\right)$$

Accordingly, convolving the feature maps 502 with the filter kernels 504 is equivalent to multiplying the unified filter kernel matrix 512 by the unified input feature map matrix 518, and results in a unified output feature map matrix 520. The unified output feature map matrix 520 has No rows, each row corresponding to an output feature map 508, and Mc×Mr columns, each column corresponding to a window index. As further disclosed below with respect to, for example, FIGS. 8B and 9, modeling convolution as an interaction between a unified filter kernel matrix 512 and a unified input feature map matrix 518 improves computational efficiency by simplifying reading input feature map 502 values from memory and writing them into the MMA accelerator memory 109.

Figure 6:
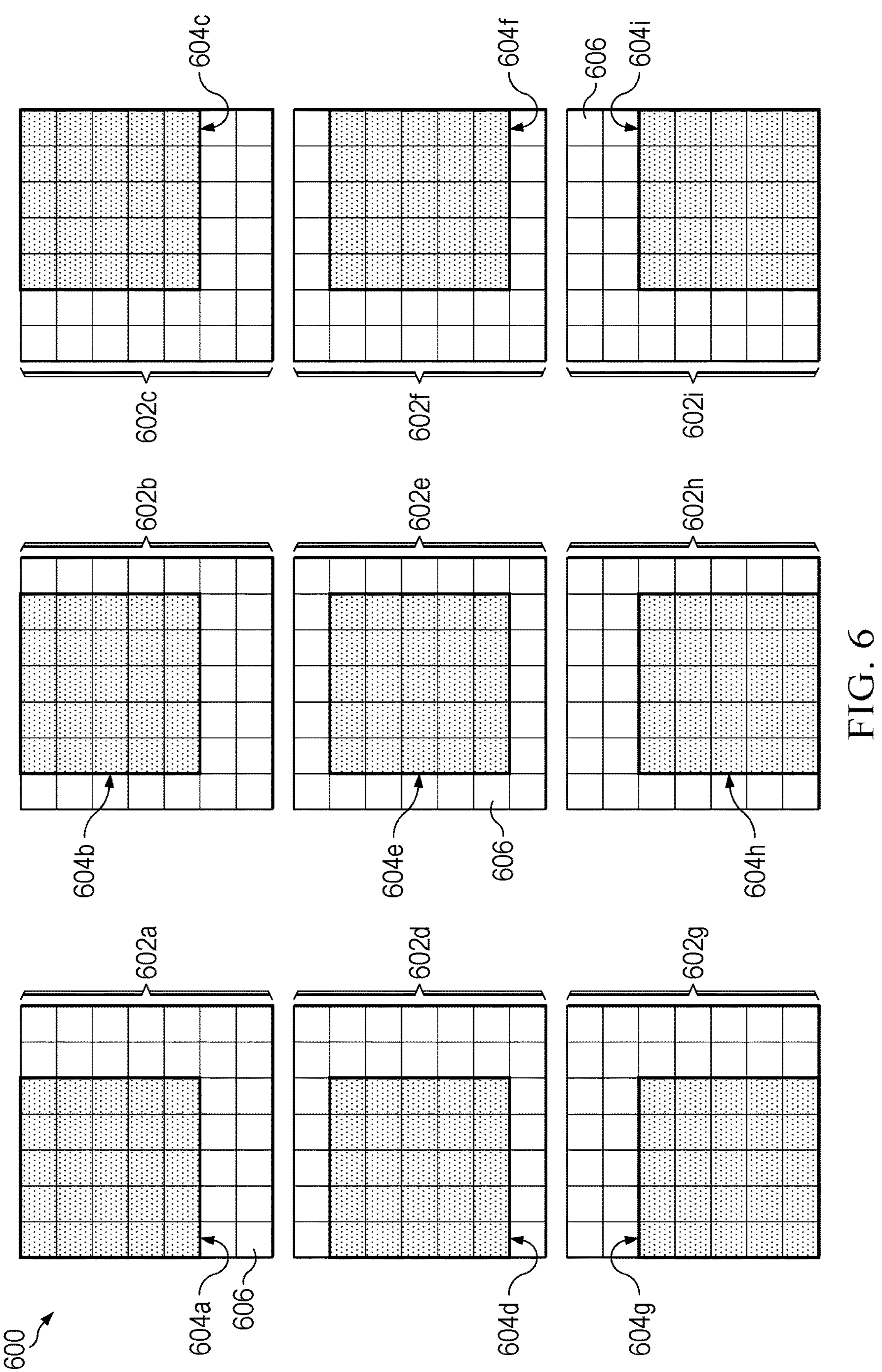
FIG. 6 shows a diagram illustrating an example interaction between filter kernels and an input feature map.

FIG. 6 shows a diagram 600 illustrating an example interaction between filter kernels and an input feature map 602. The input feature map 602 has dimensions 7×7, the different instances of the input feature map 602 as shown are numbered 602*a*, 602*b*, . . . , 602*i*. The different shaded portions 604 of the different instances of the input feature map 602 correspond to the different elements 606 of the input feature map 602 instance that can be operated on (using multiplication and addition operations) during convolution by elements in a 3×3 filter kernel (not shown) that have the same position in the filter kernel that the feature map 602 instance has in the diagram 600. The different shaded portions 604 as shown are numbered 604*a*, 604*b*, . . . , 604*i*. For example, the upper-left input feature map 602*a* corresponds to element (0,0) of the filter kernel, and the middle-right input feature map 602*f* corresponds to element (1,2) of the filter kernel. Accordingly, for example, in input feature map 602*c*, the first and second columns are not operated on during convolution by element (0,2) of the filter kernel, because the first and second columns in input feature map 602*c* are not included in element (0,2) of a window of the input feature map 602 (a window including elements 606 from the input feature map's 602 first or second row in the window's element (0,2) would have an index with a column entry of negative one or negative two, which are not available values for indices).

As shown in, for example, FIGS. 4 and 5A, output feature maps are smaller (output feature maps have smaller dimensions) than input feature maps because each element (or pixel) of the filter kernel is not operating upon each element (or pixel) in the respective input feature maps. This is shown graphically in the row dimension as shaded portions 604 of the input feature map 602 operated on by a first column of filter kernel elements (shaded portions 604*a*, 604*d*, and 604*g*), by a second column of filter kernel elements (shaded portions 604*b*, 604*e*, and 604*h*), or by a third column of filter kernel elements (shaded portions 604*c*, 604*f*, and 604*i*). Accordingly, in each row of the input feature map 602, for each filter kernel element, there are Fc−1 input feature map elements 606 not operated on by the filter kernel element (unshaded elements). A similar observation may be made in the vertical direction, as the shaded portion 604 shifts downward corresponding to different rows of elements of the filter kernel operating on the input feature map 602. This is shown graphically in the column dimension as shaded portions 604 of the input feature map 602 operated on by a first row of filter kernel elements (shaded portions 604*a*, 604*b*, and 604*c*), by a second row of filter kernel elements (shaded portions 604*d*, 604*e*, and 604*f*), or by a third row of filter kernel elements (shaded portions 604*g*, 604*h*, and 604*i*). In each column of the input feature map 602, for each filter kernel element, there are Fr−1 input feature map elements 606 not operated on by the filter kernel element. Accordingly, each input feature map 602 row has Lc−Fc+1 elements 606 (shaded portion 604) acted on by each filter kernel element during convolution (see Equation 2); and each input feature map 602 column has Lr−Fr+1 elements 606 (shaded portion 604) acted on by each filter kernel element during convolution. The specific input feature map elements 606 skipped (not operated on using MMA mathematical operations) differ for each filter kernel element.

Figure 7:
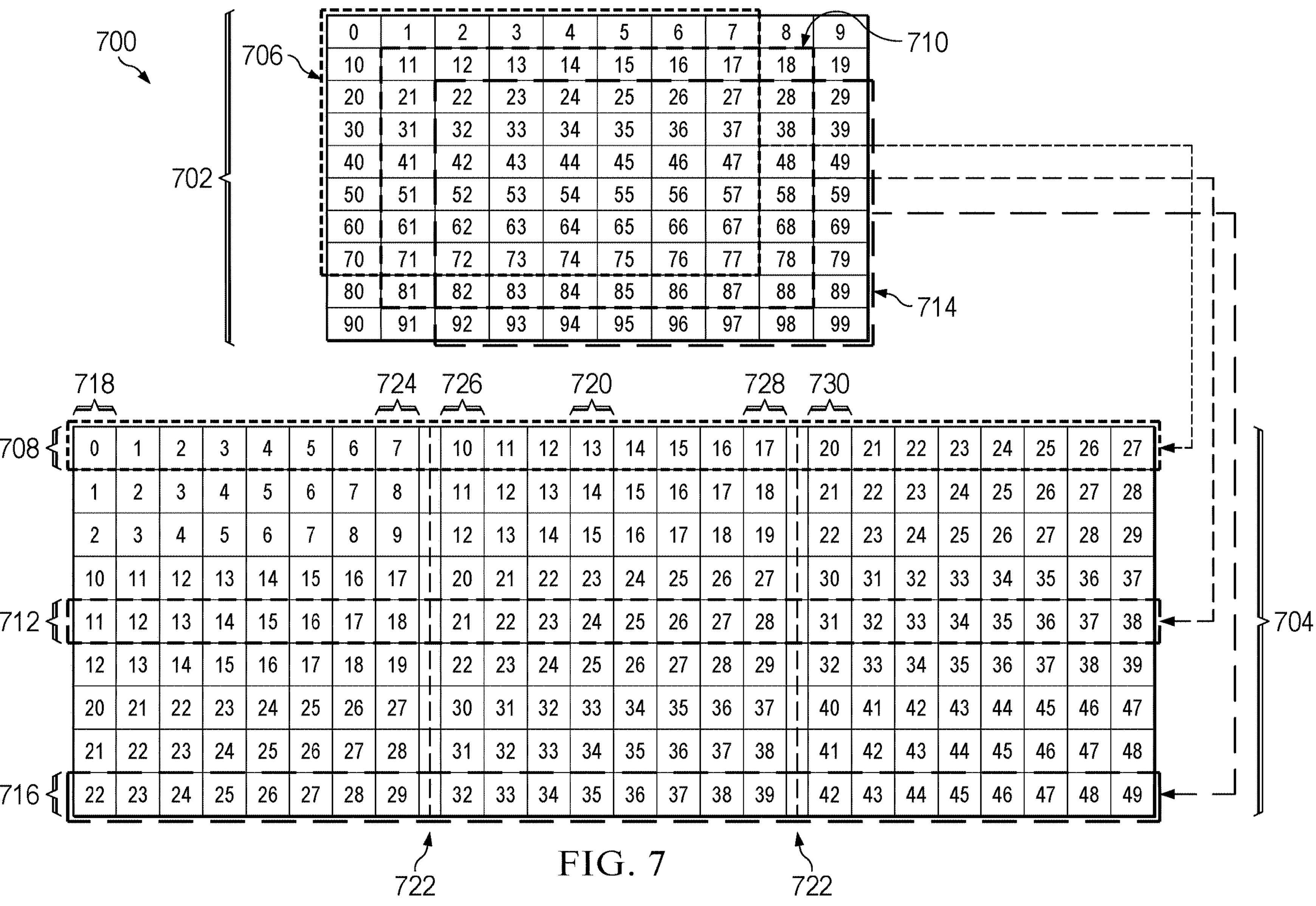
FIG. 7 shows a diagram illustrating an example interaction between an input feature map, a kernel filter (not shown), and a unified input feature map matrix.

FIG. 7 shows a diagram 700 illustrating an example interaction between an input feature map 702, a kernel filter (not shown), and a unified input feature map matrix 704. The input feature map 702 with dimensions 10×10 forms unified input feature map matrix 704 in response to a kernel filter with dimensions 3×3 (the unified input feature map matrix 704 has nine rows). Different elements of the 3×3 windows formed from the input feature map 702 correspond to, and can be viewed as forming (across the set of all indices of the input feature map 702 that can be used to form windows) different rows of the unified input feature map matrix 704. For example, a first region 706 of the input feature map 702, corresponding to element (0,0) of 3×3 windows of the input feature map 702, forms the first row 708 of the unified feature map matrix 704. A second region 710 of the input feature map 702, corresponding to element (1,1) of 3×3 windows of the input feature map 702, forms the fifth row 712 of the unified feature map matrix 704. A third region 714 of the input feature map 702, corresponding to element (2,2) of 3×3 windows of the input feature map 702, forms the ninth row 716 of the unified input feature map matrix 704.

As previously discussed, each window of the feature map 702 with the same dimensions as the filter kernel (in the diagram, 3×3) forms a column of the unified input feature map matrix 704. For example, window (0,0) forms the first column 718 of the unified input feature map matrix 704, and window (1,3) forms the twelfth column 720 of the unified input feature map matrix 704 (see Equation 2).

A gap 722 (or skip 722) occurs in the ascending sequence of input feature values propagated into the unified input feature map matrix 704, as can be seen between the eighth column 724 and ninth column 726 (where the sequence skips from 7 to 10), and between the sixteenth column 728 and seventeenth column 730 (where the sequence skips from 17 to 20), of the unified input feature map matrix 704. These skips 722 are caused by the elements in the last Fc−1 columns of the input feature map 702 not corresponding to window indices, that is, each skipped value is one to which the input feature map could not be indexed by the filter kernel. The otherwise sequential numbering of the matrix elements (without consideration of the skipped values) in the input feature map 702 can be viewed as a numbering of sequentially addressed groups of memory cells, (starting at some beginning address of a range of memory cells), each group of memory cells corresponding to a value in an element of a respective feature map. Accordingly, each row of the unified input feature map matrix 704 looks like a contiguous memory vector read from L2 cache 112 and corresponding to contents of the input feature map 702—except for the skips 722. The skipped 722 values (for example, 8, 9, 18, and 19 in the first row 708 of the unified input feature map matrix 704), which are not skipped by continuous memory vector reads, correspond to the previously described spurious data entries in the MMA accelerator's memory 109.

Figure 8A:
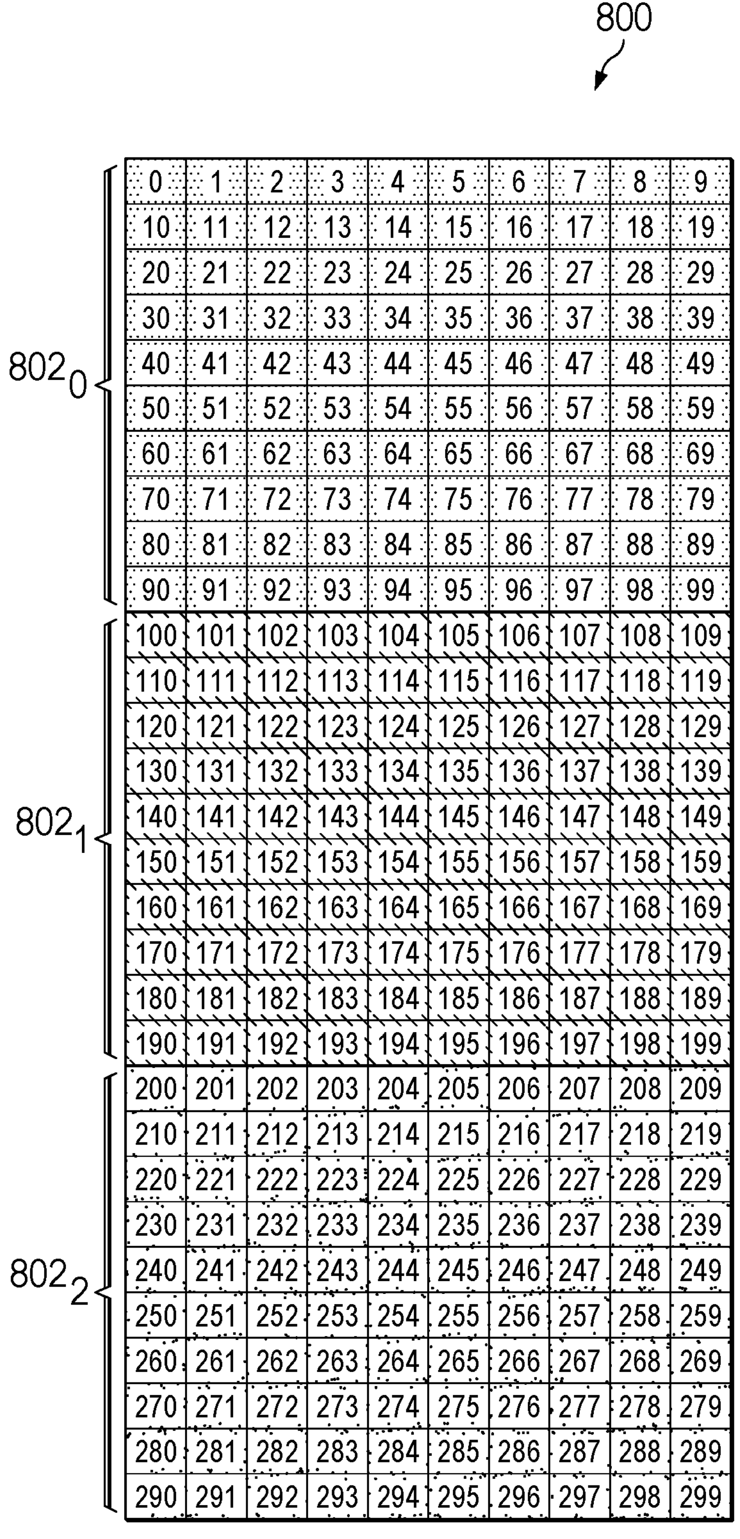
FIG. 8A shows a diagram with example input feature maps.
Figure 8B:
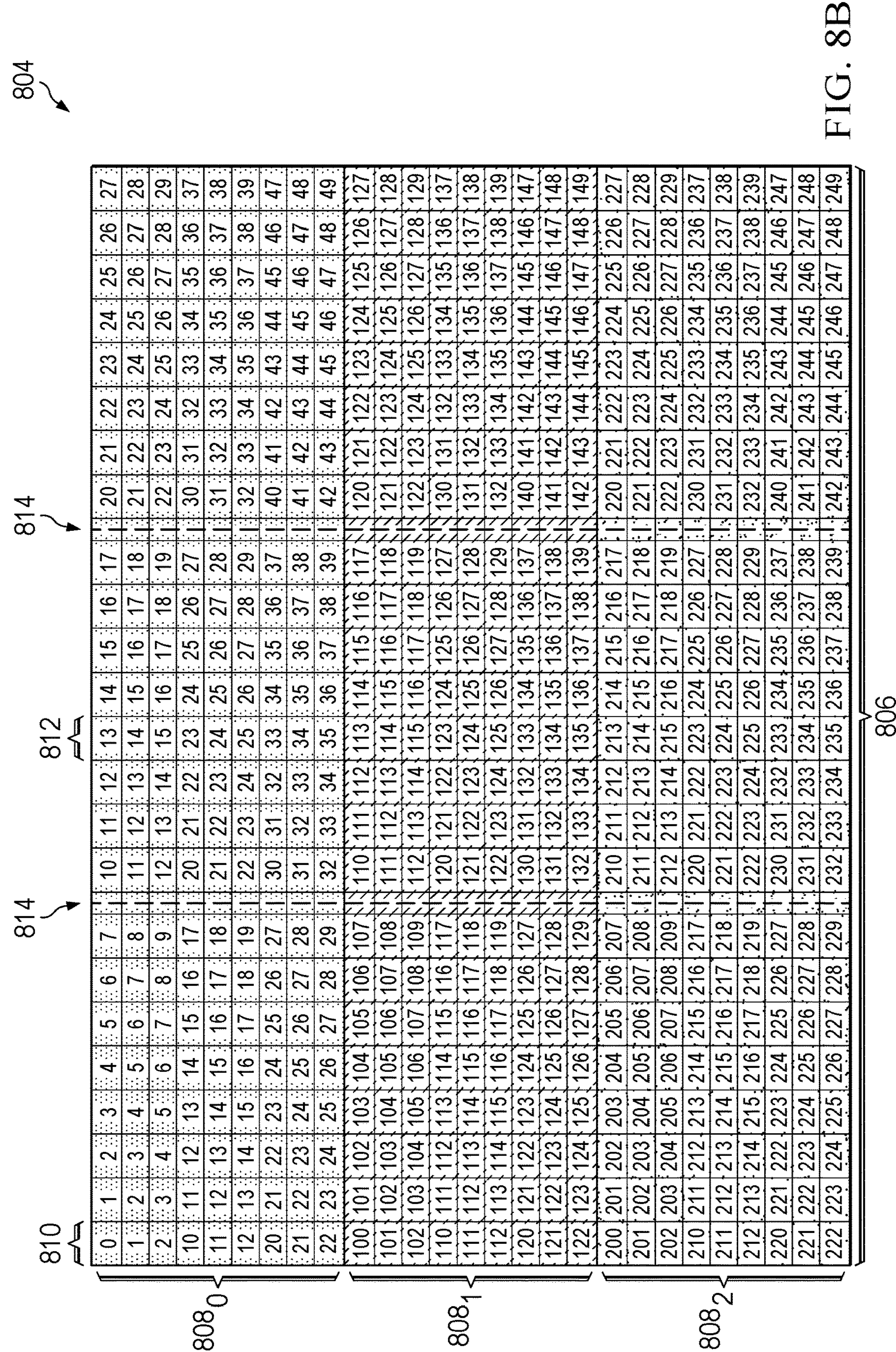
FIG. 8B shows a diagram with an example unified input feature map matrix generated using input feature maps as shown in FIG. 8A.

FIG. 8A shows a diagram 800 with example input feature maps $\mathbf{802}_0$, $\mathbf{802}_1$, and $\mathbf{802}_2$. FIG. 8B shows a diagram 804 with an example unified input feature map matrix 806 generated using input feature maps $\mathbf{802}_0$, $\mathbf{802}_1$, and $\mathbf{802}_2$ as shown in FIG. 8A. A first portion $\mathbf{808}_0$ of the unified input feature map matrix 806 is generated from input feature map $\mathbf{802}_0$. A second portion $\mathbf{808}_1$ of the unified input feature map matrix 806 is generated from input feature map $\mathbf{802}_1$. A third portion $\mathbf{808}_2$ of the unified input feature map matrix 806 is generated from input feature map $\mathbf{802}_2$. An individual column of the unified input feature map matrix 806 is generated using windows with the same index in each of the input feature maps $\mathbf{802}_0$, $\mathbf{802}_1$, and $\mathbf{802}_2$. For example, a first column 810 of the unified input feature map matrix 806 is generated using windows with index (0,0) of each of the input feature maps $\mathbf{802}_0$, $\mathbf{802}_1$, and $\mathbf{802}_2$; and a twelfth column 812 of the unified input feature map matrix 806 is generated using windows with index (1,3) of each of the input feature maps $\mathbf{802}_0$, $\mathbf{802}_1$, and $\mathbf{802}_2$. Accordingly, skips 814 are aligned across the three portions $\mathbf{808}_0$, $\mathbf{808}_1$, and $\mathbf{808}_2$ of the unified input feature map matrix 806 generated from the three input feature maps $\mathbf{802}_0$, $\mathbf{802}_1$, and $\mathbf{802}_2$.

FIG. 9 shows a diagram 900 illustrating example contents 902 of the MMA accelerator memory 109 of FIG. 1 after reading feature map data of the input feature maps $\mathbf{802}_0$, $\mathbf{802}_1$, and $\mathbf{802}_2$ of FIG. 8A from the L2 cache 112 and writing it into the MMA accelerator memory 109. The diagram 900 demonstrates that this read/write process can construct a unified input feature map matrix (albeit one with additional unwanted values described below) for processing a convolution layer of a CNN 200. A contiguous memory vector 904 of the L2 cache 112 can be read during each cycle of the clock 107. Accordingly, a cycle column 906 provides a cycle on which each contiguous memory vector 904 is read from the L2 cache 112 to be written into the MMA accelerator memory 109 as a row of the contents 902. The cycle number provided by the cycle column 906 also corresponds to a cycle on which each contiguous memory vector 904 is written into the MMA accelerator memory 109, following delay associated with processing by the first streaming engine 114 and the CPU 106. A first portion $\mathbf{908}_0$ of the contents 902 corresponds to input feature map $\mathbf{802}_0$ (of FIG. 8A), a second portion $\mathbf{908}_1$ of the contents 902 corresponds to input feature map $\mathbf{802}_1$, and a third portion 9082 of the contents 902 corresponds to input feature map $\mathbf{802}_2$.

With reference to the unwanted values, in FIG. 9 values corresponding to the skips 814 of FIG. 8B are read from the input feature maps $\mathbf{802}_0$, $\mathbf{802}_1$, and $\mathbf{802}_2$ in L2 cache 112 as spurious data values 910. The spurious data values 910 are attended to prior to completing convolution to avoid erroneous convolution results. This can result in additional computational overhead. In some examples, the additional computational overhead to compensate for spurious data values 910 written to the MMA accelerator memory 109 can be proportional to the fraction of data values read from the L2 cache 112 that are spurious—in the diagram, 25% of the data values read from each row of an input feature map $\mathbf{802}_0$, $\mathbf{802}_1$, and $\mathbf{802}_2$ in the L2 cache 112 are spurious data values 910.

FIG. 10 shows an example diagram 1000 of the input feature maps $\mathbf{802}_0$, $\mathbf{802}_1$, and $\mathbf{802}_2$ of FIG. 8A, with the addition of padding zeroes to form zero padded input feature maps 1002, where such padding can be implemented to compensate for certain of the above-described architectural and processing attributes. (Padding zeroes are shown herein as "zero" instead of as decimal numbers.) Each of the input feature maps $\mathbf{802}_0$, $\mathbf{802}_1$, and $\mathbf{802}_2$ has dimensions (Lr, Lc) of 10×10, and each feature kernel (not shown) has dimensions (Fr, Fc) of 3×3. The zero padded input feature maps 1002 include a row of zeroes 1004 above a first row (row zero) and below a last row (row ten, the $Lr^{th}$ row) of each of the input feature maps $\mathbf{802}_0$, $\mathbf{802}_1$, and $\mathbf{802}_2$ (referred to herein as vertical pad zeroes 1004), each with Lc+Fc−1 padding zeroes; and a column of zeroes 1006 to the left of the first column (column zero) and to the right of the last column (column ten, the $Lc^{th}$ column) of each of the input feature maps $802_0$, $802_1$, and $802_2$ (referred to herein as side pad zeroes 1006), each with Lr+Fr−1 padding zeroes. Each row of each of the input feature maps $802_0$, $802_1$, and $802_2$ is padded with Fc−1 zeroes, and each column of each of the input feature maps $802_0$, $802_1$, and $802_2$ is padded with Fr−1 zeroes. Accordingly, with the inclusion of the zero padding, convolution of the zero padded input feature maps 1002 and the feature kernels returns output feature maps (not shown) with the same dimensions as the input feature maps $802_0$, $802_1$, and $802_2$. This avoids the earlier-described progressive data loss that occurs, in some examples, due to the limitations of convolution of input feature maps with filter kernels of the CNN 200.

Figure 11:
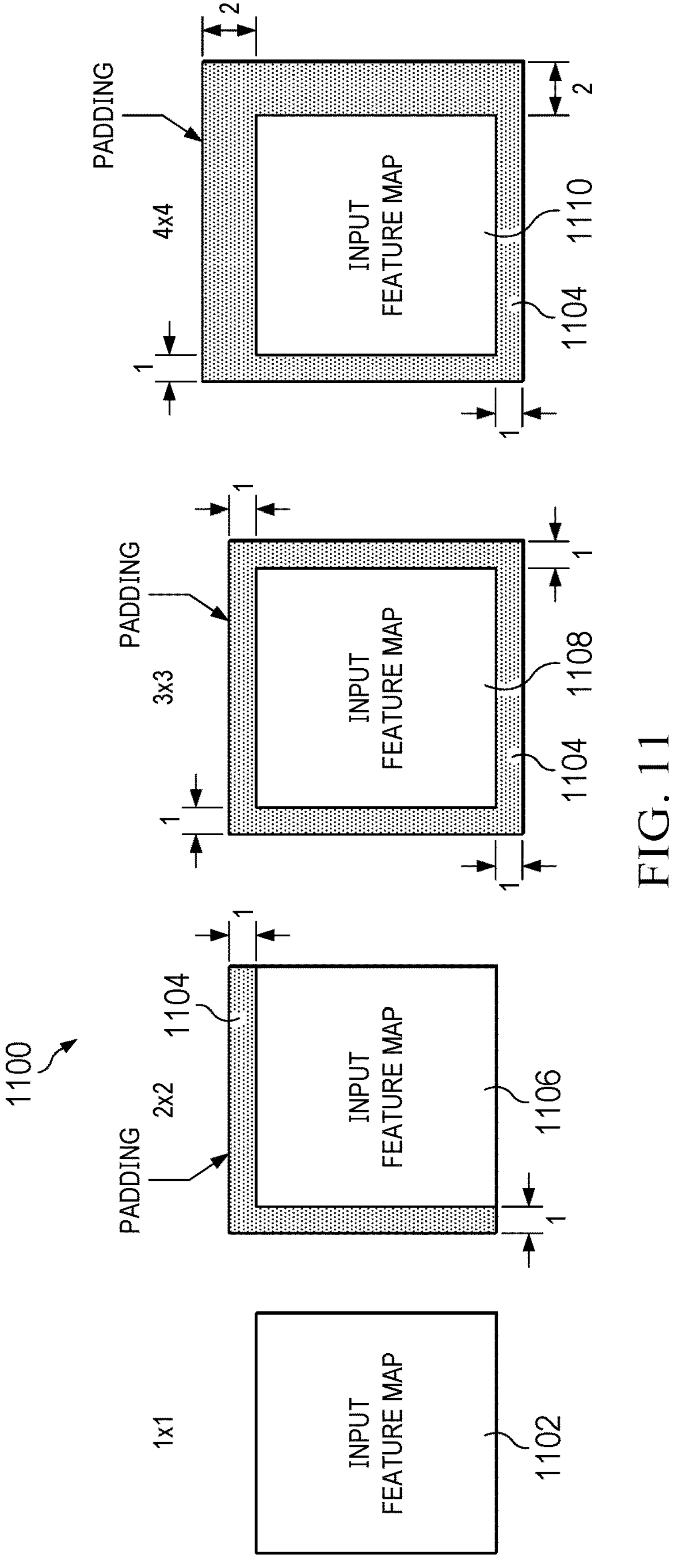
FIG. 11 shows an example diagram of zero padded input feature maps.

FIG. 11 shows an example diagram 1100 of zero padded input feature maps. The diagram 1100 illustrates that filter kernels of different dimensions correspond to different amounts of zero padding of input feature maps to enable convolution to generate output feature maps with the same dimensions as the input feature maps. For example, a first input feature map 1102 is windowed by filter kernels (not shown) of dimensions lxi. The first input feature map 1102 receives no zero padding because generated output feature maps (not shown) will have the same dimensions as the input feature map 1102 without zero padding. This is because Fc−1=Fr−1=0 (see disclosure above with respect to FIGS. 5, 6, and 7). A second input feature map 1106 is windowed by filter kernels of dimensions 2×2. The second input feature map 1106 receives one row and one column of zero padding 1104 because Fc−1=Fr−1=1. A third input feature map 1108 is windowed by filter kernels of dimensions 3×3. The third input feature map 1108 receives two rows and two columns of zero padding 1104 because Fc−1=Fr−1=2. A fourth input feature map 1110 is windowed by filter kernels of dimensions 4×4. The fourth input feature map 1110 receives three rows and three columns of zero padding 1104 because Fc−1=Fr−1=3.

FIG. 12 shows a diagram 1200 illustrating a prior art example of contents 1202 of an MMA accelerator memory after reading feature map data from an L2 cache and writing it into the MMA accelerator memory. A cycle column 1204 provides a cycle on which each respective contiguous memory vector 1209 is read from the L2 cache to be written into the MMA accelerator memory as a row of the prior art contents 1202 (similarly to FIG. 9). The feature map data from which the contents 1202 are generated corresponds to input feature maps written in L2 cache with zero padding in a manner of the zero padded input feature maps 1002 of FIG. 10, but that does not include in the L2 cache the column of zero padding to the right of the last column (right-hand zero padding column) of the respective input feature maps $802_0$, $802_1$, and $802_2$ (tenth column, the $Lc^{th}$ column). Instead, the zero padding column preceding the first column (left-hand zero padding column) of the respective input feature maps $802_0$, $802_1$, and $802_2$ is treated as fulfilling the functions of both the left- and right-hand zero padding columns. This enables construction of the prior art contents 1202 with one skip column 1206 per group of columns 1208 corresponding to a single row of an input feature map $802_0$, $802_1$, and $802_2$. Accordingly, there are ten (Lc) non-skip entries (values corresponding to windowed elements in a respective generating input feature map $802_0$, $802_1$, or $802_2$, and in some rows, a padding zero) between each skip column 1206. Note that each contiguous memory vector 1209 of the prior art contents 1202 includes a continuous sequence of feature map 802 data values (some of which are located in skip columns 1206), with padding zeroes included additionally to (rather than instead of) the feature map 802 data values and interspersed in or adjacent to skip columns 1206.

A first portion $\mathbf{1210}_0$ of the prior art contents 1202 corresponds to input feature map $802_0$, a second portion $\mathbf{1210}_1$ of the prior art contents 1202 corresponds to input feature map 8021, and a third portion $\mathbf{1210}_2$ of the prior art contents 1202 corresponds to input feature map $802_2$. Padding zeroes ("zero") in the prior art contents 1202 correspond to padding zeroes included in windows of the input feature maps $802_0$, $802_1$, and $802_2$ used to generate a corresponding unified input feature map matrix. For example, it can be seen from the diagram 1000 of FIG. 10 that a window (0,0) of the zero padded input feature map $802_0$ would contain, row by row, the values (zero zero zero) (zero 0 1) (zero 10 11). Accordingly, these are also the first nine values in the first column of the prior art contents 1202.

Figure 13:
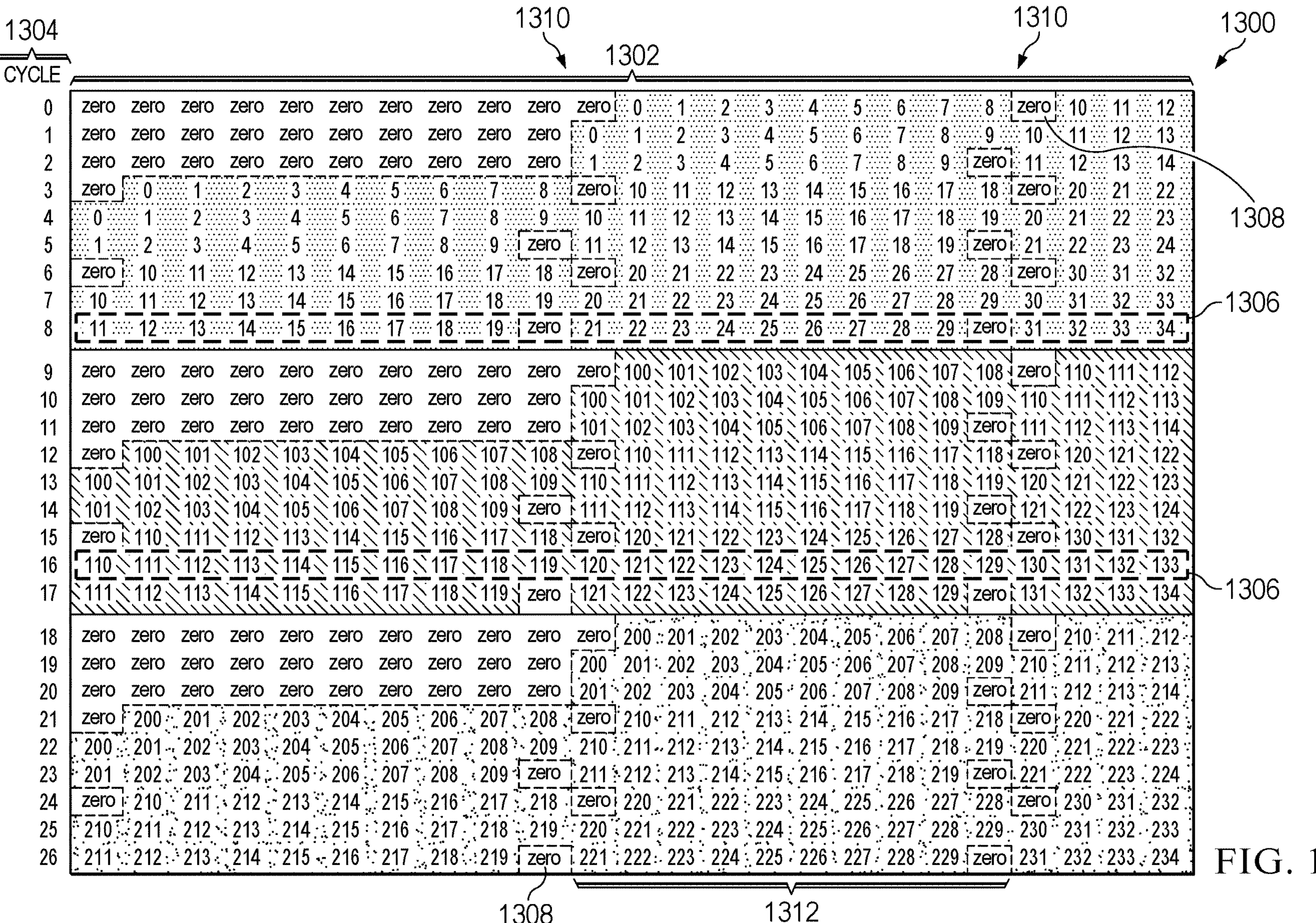
FIG. 13 shows a diagram, improving on FIG. 12, for example by reducing required processing resources, and illustrating example target contents of the MMA accelerator memory of FIG. 1 after reading feature map data from the L2 cache and writing it into the MMA accelerator memory.

FIG. 13 shows a diagram 1300, improving on FIG. 12, for example by reducing required processing resources, and illustrating example target contents 1302 of the MMA accelerator memory 109 of FIG. 1 after reading feature map data from the L2 cache 112 and writing it into the MMA accelerator memory 109. A cycle column 1304 provides a cycle on which each contiguous memory vector 1306 is read from the L2 cache 112 to be written into the MMA accelerator memory 109 as a row of the target contents 1302 (similarly to FIGS. 9 and 12). The target contents 1302 are similar to the prior art contents 1202 of FIG. 12, but the target contents 1302 does not include skip columns 1206. Accordingly, the target contents 1302 include in each contiguous memory vector 1306 a sequence of feature map 802 data values without spurious data values. Some contiguous memory vectors 1306 include padding zeroes 1308 that replace, and accordingly, make discontinuous, selected data values within the continuous sequence of feature map 802 data values. Replacing data values with padding zeroes 1308 is referred to as masking.

Padding zeroes 1308 are interspersed adjacent to feature map row-terminus locations 1310 (beginnings or endings of corresponding rows of the feature map $802_0$, $802_1$, or $802_2$, corresponding to skip column 1206 locations in the prior art contents 1202), as further discussed with respect to FIGS. 14A, 14B, 14C, 15, and 16. For example, padding zeroes 1308 mask (replace) the tenth and twentieth values ("10" and "20") in the sixth contiguous memory vector 1312 (read in the sixth cycle) of the target contents 1302. Columns between a nearest pair of feature map row-terminus locations 1310 are referred to as a group of columns 1312.

Figures 14A, 14B:
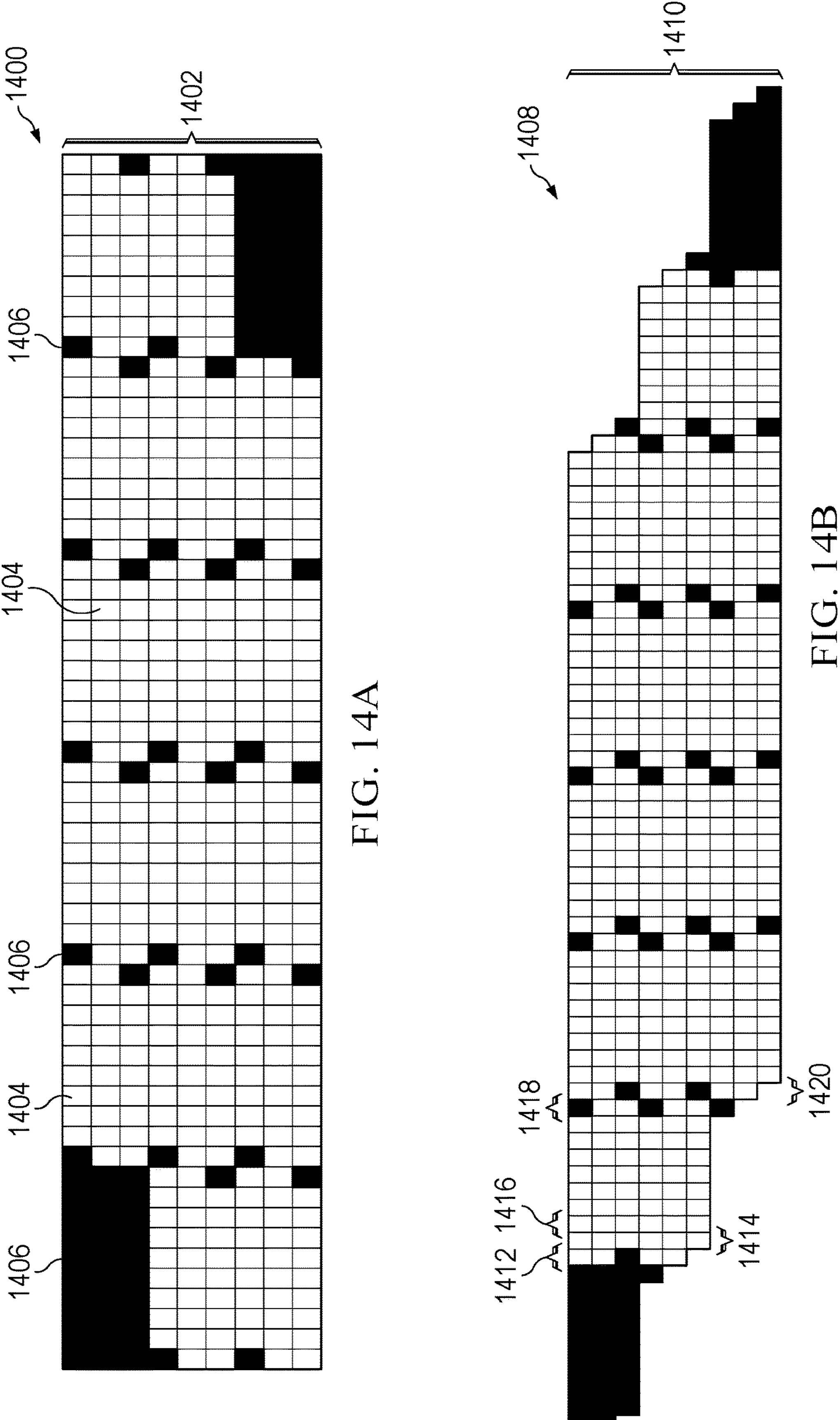
FIG. 14A shows a diagram illustrating an example first rearrangement of the target contents of FIG. 13.
FIG. 14B shows a diagram illustrating an example second rearrangement of the target contents of FIG. 13, based on the first rearrangement of FIG. 14A.

FIG. 14A shows a diagram 1400, improving on FIG. 13, for example illustrating an example first rearrangement 1402 of the target contents 1302 of FIG. 13. The first rearrangement 1402 truncates the target contents 1302, removing entire groups of columns 1312 (but not a first group of columns 1312 prior to a first feature map row-terminus location 1310, or a last group of columns 1312 following a last feature map row-terminus location 1310), for space and clarity within the figure. The first rearrangement 1402 also shows elements containing data 1404 as white, and shows elements containing zero padding 1406 as black. Note that each row of the rearrangement 1402 corresponds to a different filter kernel element, as described with respect to FIG. 7 and further addressed with respect to FIG. 14C. (The first rearrangement 1402 can also be viewed as based on feature maps with dimensions 6×10, with two columns of side pad zeroes and two rows of vertical pad zeroes, as illustrated in and discussed with respect to FIG. 14C.)

FIG. 14B shows a diagram 1408 illustrating an example second rearrangement 1410 of the target contents 1302 of FIG. 13, based on the first rearrangement 1402 of FIG. 14A. The second rearrangement 1410 aligns the data elements (white elements) 1404 so that data elements 1404 corresponding to (non-padding) zeroes are located in a first data column 1412 (a data column is a column that includes data, and may also include padding zeroes), data elements 1404 corresponding to ones are located in a second data column 1414, elements corresponding to twos are located in a third data column 1416, etc. Accordingly, elements of the first data column 1412 contain the value stored in a first L2 cache 112 element (indicated with a "0" in the input feature map $\mathbf{802}_0$), elements of the second data column 1414 contain the value stored in a second L2 cache 112 element (indicated with a "1" in the input feature map $\mathbf{802}_0$), elements of the third data column 1416 contain the value stored in the third L2 cache 112 element (indicated with a "2" in the input feature map $\mathbf{802}_0$), etc.

A tenth ($Lc^{th}$) data column 1418 includes zero padding elements 1406 adjacent to and preceding the first feature map row-terminus location 1310 of the target contents 1302, and an eleventh (Lc plus one) data column 1420 includes zero padding elements 1406 adjacent to and following the first feature map row-terminus location 1310 of the target contents 1302. Note that between rows with a zero padding element 1406 in the tenth data column 1418 and rows with a zero padding element in the eleventh data column 1420 are rows with no zero padding elements 1406 in the tenth data column 1418 or the eleventh data column 1420.

Figure 14C:
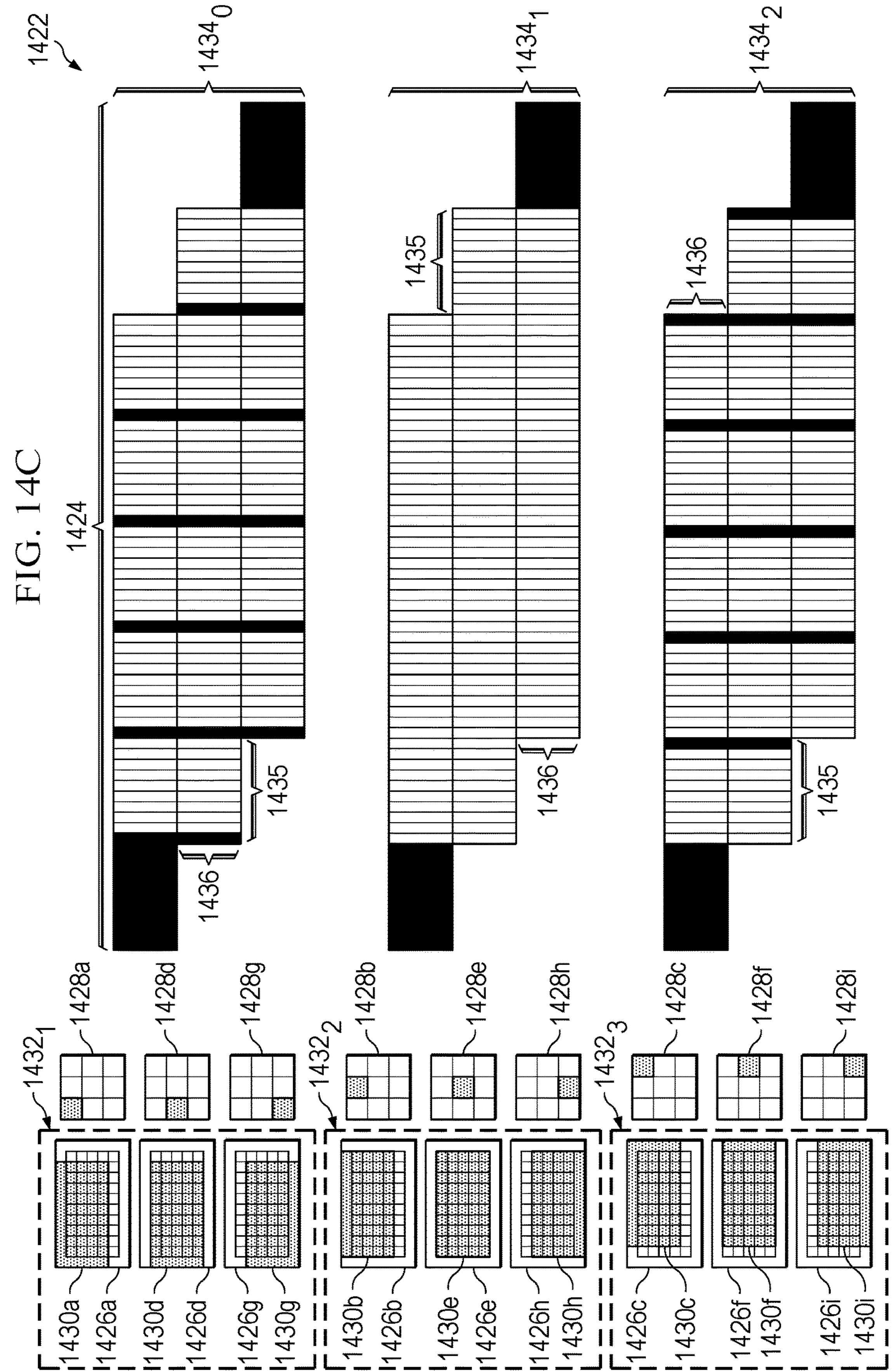
FIG. 14C shows a diagram illustrating an example third rearrangement of the target contents of FIG. 13, based on the second rearrangement of FIG. 14B and the input feature map of FIG. 8.

FIG. 14C shows a diagram 1422 illustrating an example third rearrangement 1424 of the target contents 1302 of FIG. 13, based on the second rearrangement 1410 of FIG. 14B and the input feature map 802 of FIG. 8. Various instances of an input feature map 1426 of dimensions 6×10 (input feature map instances 1426*a*, 1426*b*, . . . , and 1426*i*, numbered similarly to input feature map instances 602*a*, 602*b*, . . . , and 602*i* of FIG. 6) are grouped with respect to a column of a 3×3 filter kernel (filter kernel 1428) that operates on a shaded portion 1430*a*, 1430*b*, . . . , or 1430*i* of the respective instance of the input feature map 1426*a*, 1426*b*, . . . , or 1426*i* (the shaded portion 1430*a*, 1430*b*, . . . , or 1430*i* is numbered according to the respective input feature map instance 1426*a*, 1426*b*, . . . , or 1426*i*). The input feature map 1426 includes two columns of side pad zeroes and two rows of vertical pad zeroes (patterned cells around the exterior of the input feature map 1426). A first group $\mathbf{1432}_1$ corresponds to a first column (column zero) of the filter kernel 1428, and includes input feature map instances 1426*a*, 1426*d*, and 1426*g*. A second group 14322 corresponds to a second column (column one) of the filter kernel 1428, and includes input feature map instances 1426*b*, 1426*e*, and 1426*h*. A third group 14323 corresponds to a third column (column two) of the filter kernel 1428, and includes input feature map instances 1426*c*, 1426*f*, and 1426*i*. Instances of the filter kernel 1428 are numbered 1428*a*, 1428*b*, . . . , and 1428*i* depending on the element of the filter kernel 1428 (shaded portion of the respective filter kernel 1428 instance) that operates on the shaded portion 1430*a*, 1430*b*, . . . , or 1430*i* of the respective adjacent input feature map instance 1426*a*, 1426*b*, . . . , or 1426*i*.

As in the second rearrangement 1410, data columns of the third rearrangement 1424 are aligned so that each element in a data column contains the same value stored in the same L2 cache 112 memory cell corresponding to the same input feature map 802 element. A first portion $\mathbf{1434}_0$ of the target contents 1302 corresponds to the rows of the target contents 1302 generated using elements of the first column of the filter kernel 1428. A second portion $\mathbf{1434}_1$ of the target contents 1302 corresponds to the rows of the target contents 1302 generated using elements of the second column (center column, for a 3×3 filter kernel) of the filter kernel 1428. A third portion $\mathbf{1434}_2$ of the target contents 1302 corresponds to the rows of the target contents 1302 generated using elements of the third column of the filter kernel 1328. The third rearrangement 1424 shows that padding zeroes are periodic within respective sets of rows $\mathbf{1434}_0$, $\mathbf{1434}_1$, and $\mathbf{1434}_2$ of the target contents 1302 generated by respective columns of the filter kernel 1428. That is, patterns of masked and unmasked elements repeat, at a scale of groups of Lc aligned elements 1435. (Groups of aligned elements 1435 are shifted to the left or right with respect to corresponding columns of respective input feature maps 802, due to different start point locations of corresponding contiguous memory vectors.) Accordingly, example architecture and processes may be improved by structural and functional implementations informed by the recognition that padding zeroes are located in positions that can be identified and characterized with respect to (1) the beginnings or ends of rows of respective input feature maps, and (2) the column of the filter kernel corresponding to the respective contiguous memory vector 1436.

FIG. 15A shows a table 1500 with example masking rule entries that positionally characterize zero padding as noted above, that is, by describing zero padding locations relative to attributes of contiguous non-zero padded memory vectors read from L2 cache 112 and written into the MMA accelerator memory 109, and in order to prepare for convolution according to a convolution layer of the CNN 200 of FIG. 2. In other words, so long as the table 1500 entries are followed, the results of the FIG. 14C rearrangement 1424 may be achieved with respect to padding zeroes corresponding to side pad columns. This includes zero padding in the appropriate positions to achieve the corresponding appropriate convolution. Specifically, entries in elements of a filter column 1502 index a column of an N×N filter kernel as a function of the column dimension N, where N is odd (adjustment for even N is described below with respect to FIGS. 15B and 15C). Entries in elements of a padding column 1504 describe if and where padding zeroes are to be applied. Such padding zeroes may be applied on the fly, rather than by storing the zeroes in memory, by the pad insertion block 118 to mask feature map data values in a contiguous memory vector read from L2 cache 112 and transmitted via the first streaming engine 114 (and the CPU 106) to be written into the MMA accelerator memory 109 for convolution. Data values are masked by the pad insertion block 118 in contiguous memory vectors read from the L2 cache 112. Application of padding zeroes is performed on the fly by the pad insertion block 118 during transfer of contiguous memory vectors from the L2 cache 112 to the MMA acceleration memory 109 enables input feature maps to be stored in the L2 cache 112 without side pad zeroes (padding zeroes to the left and right of input feature maps; see side pad zeroes 1006 discussed with respect to FIG. 10).

As described in a first row 1506 of the table 1500, a center column of a filter kernel can be represented as the $((N-1)/2)^{th}$ column. For a 3×3 filter kernel, this is the column with index equal to one, which corresponds to the second portion $\mathbf{1434}_1$ of the third rearrangement 1422. No padding zeroes are added to contiguous memory vectors to be operated on by, and read from L2 cache 112 in response to, the center column of the filter kernel.

As described in a fourth row 1508 of the table 1500, columns to the left of the center column of the filter kernel (with index less than the index of the center column) can be represented as the $((N-1)/2-K)^{th}$ column, where K is a number between one and (N−1)/2. Data values generated from a row of a corresponding input feature map read in response to the $K^{th}$ column to the left of the center column of the filter kernel are masked. Specifically, data values are masked (replaced with padding zeroes) corresponding to the K right-most elements in each group of elements (such as a group of elements 1312); that is, the K elements nearest to the left of a feature map row-terminus location (such as feature map row-terminus location 1310; an end of a row of elements in an input feature map). For example, referring to FIG. 13, the contiguous memory vector read in cycle zero corresponds to filter kernel cell (0,0), which is located one column to the left of the center column of the filter kernel. Accordingly, an element corresponding to "9"—the last (right-most) entry in the first row of the corresponding input feature map $\mathbf{802}_0$—is masked. Referring to FIG. 14C, this masked right-most element can also be viewed as a masked left-most element in a group of aligned elements 1435. This results from contiguous memory vectors corresponding to filter kernel columns K columns to the left of center having start points shifted K elements to the left (elements to the left of a first element of a corresponding input feature map are masked, and can be considered to be defined as masked).

Similarly, as described in a seventh row 1510 of the table 1500, columns to the right of the center column of the filter kernel (with index greater than the index of the center column) can be represented as the $((N-1)/2+K)^{th}$ column, where K is a number between one and (N−1)/2. Data values generated from a row of a corresponding input feature map read in response to the $K^{th}$ column to the right of the center column of the filter kernel are masked. Specifically, data values are masked corresponding to the K left-most elements in each group of elements; that is, the K elements nearest to the right of a feature map row-terminus location (a beginning of a row of elements in an input feature map). For example, referring to FIG. 13, the contiguous memory vector read in cycle zero corresponds to filter kernel cell (0,0), which is located one column to the right of the center column of the filter kernel. Accordingly, an element corresponding to "10"—the first (left-most) entry in the second row of the corresponding input feature map $\mathbf{802}_0$—is masked. Referring to FIG. 14C, this masked left-most element can also be viewed as a masked right-most element in a group of aligned elements 1435. This results from contiguous memory vectors corresponding to filter kernel columns K columns to the right of center having start points shifted K elements to the right (elements to the right of a last element of a corresponding input feature map are masked, and can be considered to be defined as masked).

FIG. 15B shows a table 1512 with example masking rule entries that positionally characterize zero padding as noted above, that is, by describing zero padding locations relative to attributes of contiguous non-zero padded memory vectors read from L2 cache 112 and written into the MMA accelerator memory 109, and in order to prepare for convolution according to a convolution layer of the CNN 200 of FIG. 2. Entries in elements of a filter column 1514 index a column of an N×N filter kernel as a function of the column dimension N, where N is even, and where corresponding input feature maps are treated as having N/2 side pad columns on the left and (N/2)−1 side pad columns on the right. The center column is treated as the column with index N/2.

FIG. 15C shows a table 1516 with example masking rule entries that positionally characterize zero padding as noted above, that is, by describing zero padding locations relative to attributes of contiguous non-zero padded memory vectors read from L2 cache 112 and written into the MMA accelerator memory 109, and in order to prepare for convolution according to a convolution layer of the CNN 200 of FIG. 2. Entries in elements of a filter column 1518 index a column of an N×N filter kernel as a function of the column dimension N, where N is even, and where corresponding input feature maps are treated as having (N/2)−1 side pad columns on the left and N/2 side pad columns on the right. The center column is treated as the column with index (N−2)/2.

The tables 1512 and 1516 of FIGS. 15B and 15C (respectively) show that contiguous memory vectors corresponding to columns that are K columns to the left or right of the center column of a filter kernel with an even number N of columns can be treated the same as contiguous memory vectors corresponding to similarly disposed columns (with respect to a center column) of a filter kernel with an odd number N of columns (as described with respect to the table 1500 of FIG. 15A).

FIG. 16 shows a diagram 1600 illustrating a series of contiguous memory vectors 1602 read from the L2 cache 112 and masked by the pad insertion block 118. The contiguous memory vectors 1602 are produced using a portion of an input feature map (starting with a second row, "row 1") of dimensions 10×10 and a filter kernel (not shown) of dimensions 13×13 (these dimensions are used solely to demonstrate a variety of mask sizes). Contiguous memory vectors 1602 are labeled by the distance of the filter kernel column used to generate them from a center column of the filter kernel. For example, col +3 (three columns to the right of the center column) includes three elements masked on the left-hand side of each aligned group of cells; col 0 (the center column) includes no masked elements; and col −2 (two columns to the left of the center column) includes two elements masked on the right-hand side of each aligned group of cells. The diagram 1600 provides an example application of the masking rules described with respect to FIG. 15.

In some examples, vertical pad zeroes can also be addressed by inserting zeroes, using the pad insertion block 118, into contiguous memory vectors that are read from the L2 cache 112 into the MMA accelerator memory 109. For an input feature map modelled as having W total side pad zeroes, X vertical pad rows above row 0, and Y vertical pad rows below row Lr−1, the first Fc contiguous memory vectors include X×(Lc−Fc+1+W)) leading zeroes, inserted at the beginning of respective contiguous memory vectors. The next Fc contiguous memory vectors include (X−1)×(Lc−Fc+1+W)) leading zeroes. And so on, through a block of Fc contiguous memory vectors that include (Lc−Fc+1+W)) leading zeroes, subsequent contiguous memory vectors corresponding to the input feature map not including leading zeroes. Similarly, the last Fc contiguous memory vectors include Y×(Lc−Fc+1+W)) trailing zeroes, inserted at the end of respective contiguous memory vectors. The previous Fc contiguous memory vectors include (Y−1)×(Lc−Fc+1+W)) trailing zeroes. And so on, through a block of Fc contiguous memory vectors that include (Lc−Fc+1+W)) trailing zeroes, prior contiguous memory vectors corresponding to the input feature map not including trailing zeroes.

Figure 17:
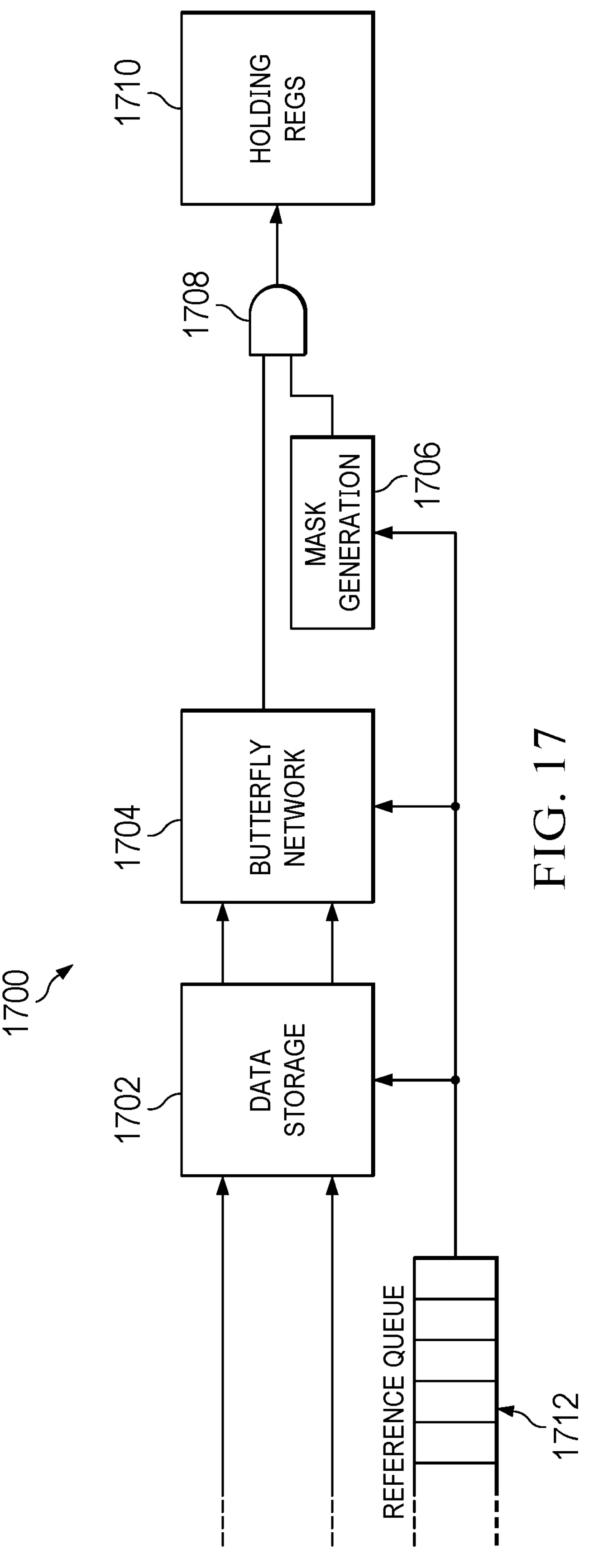
FIG. 17 shows an example datapath block diagram of the first streaming engine of FIG. 1.

FIG. 17 shows an example datapath 1700 block diagram of the first streaming engine 114 of FIG. 1. In some examples, the datapath 1700 also applies to the second streaming engine 120 of FIG. 1. The datapath 1700 includes data storage 1702 (an internal cache of the streaming engine), a butterfly network 1704, a mask generation block 1706, an AND logic gate 1708, holding registers 1710, and a reference queue 1712. The reference queue 1712 stores a sequence of references generated by the address generator 117. This information drives the butterfly network 1704 (the data formatting network) to enable the first streaming engine 114 to present data to the CPU 106 in the correct order, to enable processing as described above.

Entries in the reference queue 1712 contain information used to read data out of the L2 cache 112 and align the data for the CPU 106. For example, a reference includes all tag identifiers (IDs) associated with a memory access, alignment and rotation to be performed on retrieved data, a number of valid bytes in the retrieved memory vector prior to applying masking, a number of invalid bytes in the retrieved memory vector to mask prior to a first valid byte, and masking control information. Relevant portions of this information are passed by the reference queue 1712 to the data storage 1702, the butterfly network 1704, and the mask generation block 1706. Alignment and rotation are further described with respect to the butterfly network 1704 and FIGS. 19 through 22. Masking is further described with respect to the mask generation block 1706 and FIGS. 18A and 18B. In some examples, the streaming engine's data storage 1702 (internal cache) is fully associative, so that any cacheline can be placed in any of the entries within the data storage 1702. A tag ID indicates which cache entry index a cacheline is to be placed in. In some examples, a reference can include multiple tag IDs.

In some examples, an allocation and tracking logic 2124 (not shown in FIG. 17; see FIG. 21) inserts references in the reference queue 1712 as the address generator 117 generates new addresses. The allocation and tracking logic 2124 removes references from the reference queue 1712 when the data corresponding to the references becomes available and there is room in the formatting pipeline to process the corresponding data. Data corresponding to a reference becomes available when the data retrieved from the L2 cache 112 is stored in the data storage 1702 and can be read out via read ports of the data storage 1702. Also, as the first streaming engine 114 removes a reference from the reference queue 1712, the first streaming engine 114 checks whether the reference represents a last reference in the reference queue 1712 containing a corresponding tag ID. If so, the allocation and tracking logic 2124 marks the corresponding tag ID inactive once the first streaming engine 114 reads corresponding data from the data storage 1702 for a final time (to complete formatting of the data to enable passing formatted data to the CPU 106).

The butterfly network 1704 receives data from the L2 cache 112 via the data storage 1702, and performs alignment and rotation on the data. For example, the butterfly network 1704 can be used to format the data so that it can be treated as contiguous memory vectors, arranged as portions of input feature maps in preparation for matrix operations as described above. The formatted data is then passed to a first input of the AND logic gate 1708. The mask generation block 1706 generates a stream of ones and zeroes, which are output to a second input of the AND logic gate 1708. The AND logic gate 1708 accordingly accomplishes zero padding, as described above, by performing an AND logical operation on the butterfly network 1704 and mask generation block 1706 outputs. The zero padded, formatted data is then passed to the holding registers 1710 for buffering and outputting to the CPU 106.

Figure 18A:
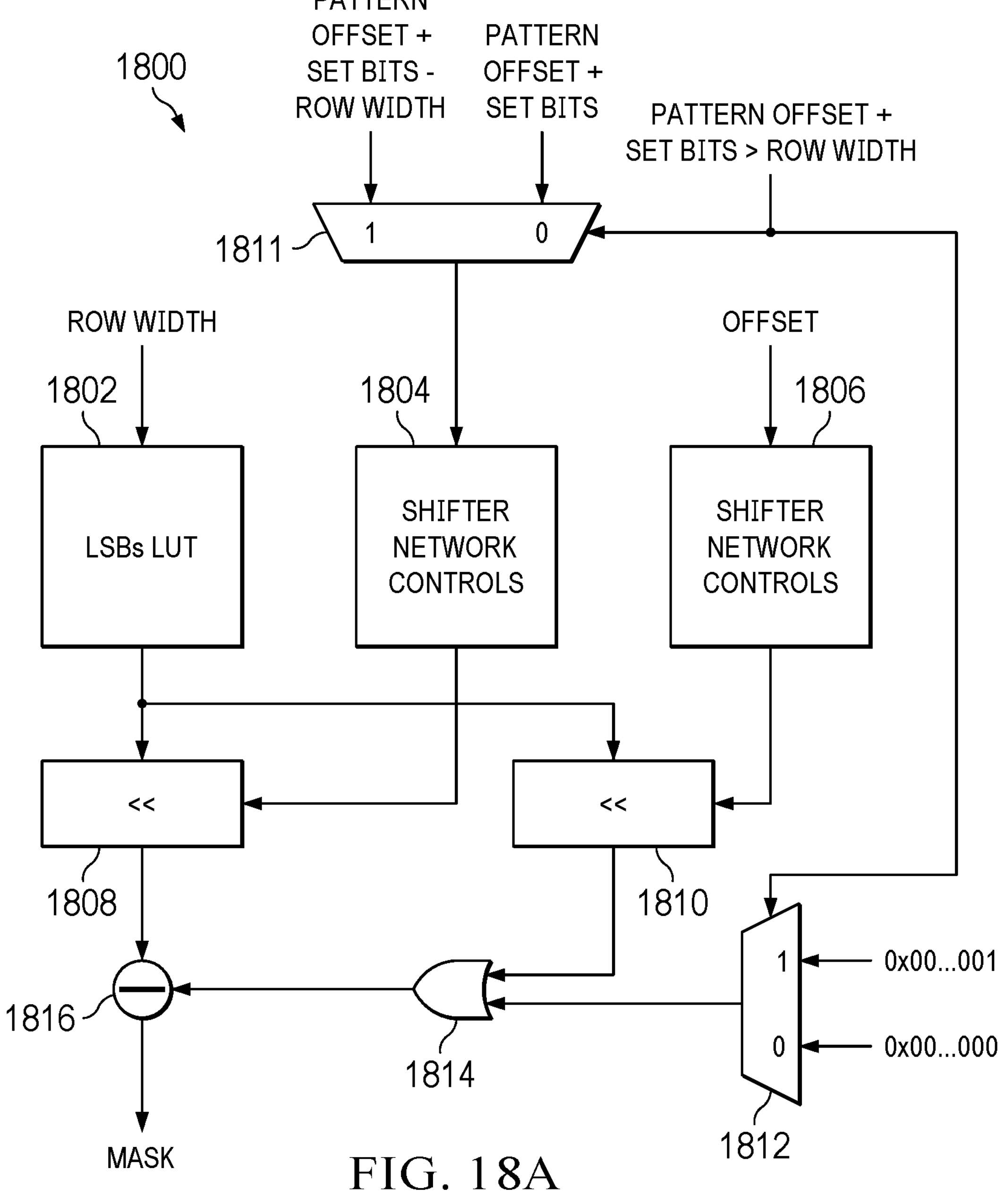
FIG. 18A shows a functional block diagram of an example mask generation network.

FIG. 18A shows a functional block diagram of an example mask generation network 1800. The mask generation network 1800 includes a least significant bits (LSBs) lookup table (LUT) 1802, a first shifter network control block (first shifter network controls) 1804, a second shifter network control block (second shifter network controls) 1806, a first shifter network (<<) 1808, a second shifter network (<<) 1810, a first multiplexer 1811, a second multiplexer 1812, an OR logic gate 1814, and a subtraction block 1816. The mask generation network 1800 generates a mask, which is a bit vector that repeats a pattern of selected length in response to a row width, a number of set bits, and a pattern offset.

Figure 18B:
FIG. 18B shows an example least significant bits (LSBs) lookup table (LUT).

The LSBs LUT 1802 receives as input a row width of a feature map matrix, such as the input feature maps $\mathbf{802}_0$, $\mathbf{802}_1$, and $\mathbf{802}_2$ of FIG. 8A, and outputs a bit pattern in response. An example LSBs LUT 1802 is shown in FIG. 18B. In the LSBs LUT 1802, each LUT row 1818 is numbered. An LUT 1818 row numbered N provides a vector comprised of repetitions of a one (the LSB) preceded by N−1 zeroes (the N−1 higher order bits to the left of the one), starting with a one in the LSB of each row. Accordingly, the period of the repeated pattern is N, the LUT row 1818 number. The LSBs LUT 1802 outputs to a first input of the first shifter network 1808 and a first input of the second shifter network 1810.

The first multiplexer 1811 receives as a first input a pattern offset plus a number of set bits minus the row width, and receives as a second input the pattern offset plus the number of set bits. The first multiplexer 1811 outputs the first input on receiving a logical zero control input, and outputs the second input on receiving a logical one control input. The first multiplexer 1811 receives as a control input the truth value of pattern offset+set bits>row width, which provides a logical one if the inequality is true, and a logical zero if the inequality is false. The pattern offset corresponds to the $K^{th}$ column to the left (or in some examples, the right) of the center column of the filter kernel in response to which a row of an input feature map is read, as discussed with respect to FIGS. 15A through 16, above. The pattern offset is determined in response to the row width, a number of elements per advance, an advance signal provided by the reference queue 1712, and the related column of the filter kernel (as discussed with respect to, for example FIG. 14C). The number of set bits is the number of unmasked matrix elements in a row. The number of set bits is determined in response to the number of elements per advance and the advance signal provided by the reference queue 1712.

Advance refers to horizontal stride across an input feature map, and elements per advance refers to the length of that stride. If padded input feature maps are larger (width×height) than the memory vector width (such as the width of a single instruction/multiple data (SIMD) memory vector), then output feature maps are produced iteratively, one memory vector at a time. The elements per advance (the horizontal stride) is the memory vector width, in elements, from the beginning of a most recently read memory vector to the beginning of the next memory vector to be read (which, as described above, is not necessarily equal to the width of a memory vector). In some examples, the advance signal is a field that is either one or zero in each reference in the reference queue 1712. The pattern offset is recalculated when a reference with the advance signal asserted is popped from the reference queue 1712.

The first shifter network control block 1804 receives as input the output of the first multiplexer 1811. The first shifter network control block 1804 provides a first set of control signals to a second input of the first shifter network 1808. The second shifter network control block 1806 receives the pattern offset as input and responsively generates a second set of control signals. The second shifter network control block 1806 provides the second set of control signals to a second input of the second shifter network 1810.

The first shifter network 1808 outputs to a first input of the subtraction block 1816. The second multiplexer 1812 receives a signal to force a first bit of the output of the second shifter network 1810 to be a binary one (0x00 . . . 001) as a first input, and receives a signal to force the first bit of the output of the second shifter network to be a binary zero (0x00 . . . 000) as a second input. The second multiplexer 1812 receives as a control input the truth value of pattern offset+set bits>row width, which (as described above) provides a logical one if the inequality is true, and a logical zero if the inequality is false. The second shifter network 1810 outputs to a first input of the OR logic gate 1814, and the second multiplexer 1812 outputs to a second input of the OR logic gate 1814. The OR logic gate outputs to a second input of the subtraction block 1816. Together, the second multiplexer 1812 and the OR logic gate are used to set a bit 0 (a first bit) of the output from the second shifter network 1810 to a value conditioned on the pattern offset, set bits, and row width.

The mask generation network 1800 generates selected repeated strings of contiguous ones and contiguous zeroes using the understanding that $2^M \times (2^N - 1)$ generates N ones shifted M bits to the left, producing N ones followed by M zeroes. In an example, T equals the bit-length period of the pattern (which equals the LSBs LUT 1802 row number), S equals the number of set bits, and O equals the pattern offset. If T equals eight and S equals five, then the resulting pattern is 00011111. If O equals three, and a full vector width equals 32 bits, then the full vector would equal:

11111000_11111000_11111000_11111000

The mask generation block 1800 generates the mask vector by rotating two separate instances of an LSBs LUT row vector, and then subtracting one rotated vector from the other to populate multiple (all) repetitions of a desired pattern simultaneously. Accordingly, the output of the subtraction block 1816 is given by Equation 3, where i iterates from zero to the number of repetitions of the pattern to be generated:

$$\text{VECTOR} = \sum_i \left(2^{O+i\times T} \times (2^s - 1)\right) = 2^{S+O} \times \sum_i 2^{i\times T} - 2^O \times \sum_i 2^{i\times T} \quad \text{Equation 3}$$

The last iteration enables the pattern to be generated with zeroes on the left—for example, 00011111 . . . 00011111.

Figure 19:
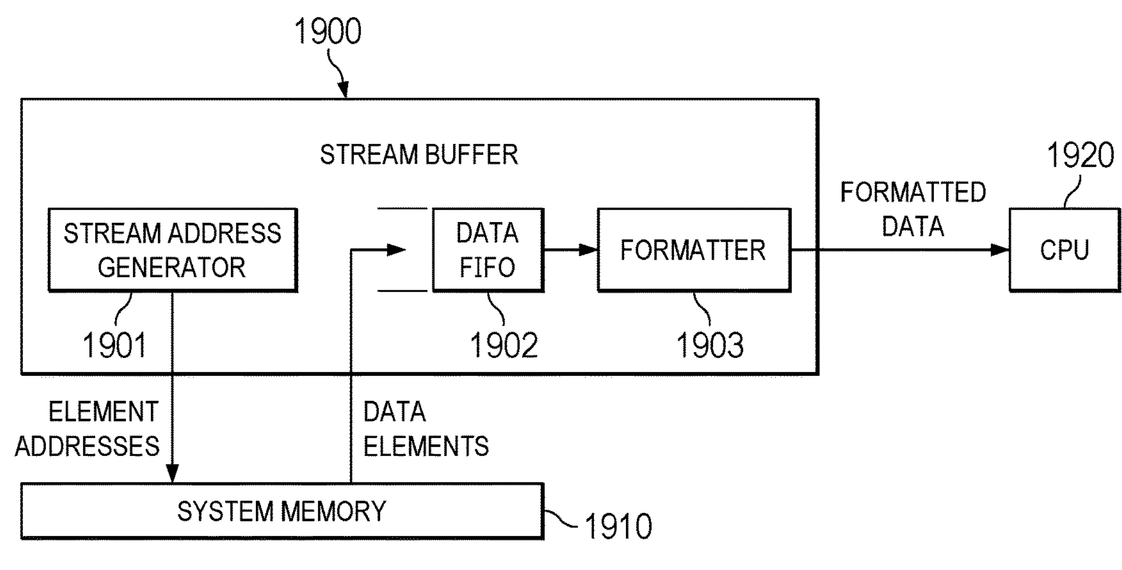
FIG. 19 illustrates a conceptual view of an example single stream of a streaming engine, such as the first streaming engine or the second streaming engine of FIG. 1.

FIG. 19 illustrates a conceptual view of an example single stream of a streaming engine 1900, such as the first streaming engine 114 or the second streaming engine 120 of FIG. 1. The streaming engine 1900 includes stream address generator 1901. Stream address generator 1901 sequentially generates addresses of the elements of the stream and supplies these element addresses to system memory 1910. System memory 1910 recalls data stored at the element addresses (data elements) and supplies these data elements to data first-in-first-out (FIFO) memory 1902. Data FIFO 1902 provides buffering between memory 1910 and CPU 1920. Data formatter 1903 receives the data elements from data FIFO memory 1902 and provides data formatting according to the stream definition. This process will be described below. Streaming engine 1900 supplies the formatted data elements from data formatter 1903 to the CPU 1920. The program on CPU 1920 consumes the data and generates an output.

In some examples, stream elements reside in normal memory. The memory itself imposes no particular structure upon the stream. Programs define streams and therefore impose structure, by specifying the following stream attributes: the address of the first element of the stream; size and type of the elements in the stream; formatting for data in the stream; and the address sequence associated with the stream.

The streaming engine 1900 defines an address sequence for elements of the stream in terms of a pointer walking through memory. A multiple-level nested loop controls the path the pointer takes. An iteration count for a loop level indicates the number of times that level repeats. A dimension gives the distance between pointer positions of that loop level.

In a basic forward stream, the innermost loop consumes physically contiguous elements from memory. The implicit dimension of this innermost loop is one element. The pointer itself moves from element to element in consecutive, increasing order. In each level outside the inner loop, that loop moves the pointer to a new location based on the size of that loop level's dimension.

This form of addressing allows programs to specify regular paths through memory in a small number of parameters. Table 4 lists the addressing parameters of a basic stream.

TABLE 4

| Parameter | Definition |
|---|---|
| ELEM_BYTES | Size of each element in bytes |
| ICNT0 | Number of iterations for the innermost loop level 0. At loop level 0 all elements are physically contiguous DIM0 is ELEM BYTES |
| ICNT1 | Number of iterations for loop level 1 |
| DIM1 | Number of bytes between the starting points for consecutive iterations of loop level 1 |
| ICNT2 | Number of iterations for loop level 2 |
| DIM2 | Number of bytes between the starting points for consecutive iterations of loop level 2 |
| ICNT3 | Number of iterations for loop level 3 |
| DIM3 | Number of bytes between the starting points for consecutive iterations of loop level 3 |
| ICNT4 | Number of iterations for loop level 4 |
| DIM4 | Number of bytes between the starting points for consecutive iterations of loop level 4 |
| ICNT5 | Number of iterations for loop level 5 |
| DIM5 | Number of bytes between the starting points for consecutive iterations of loop level 5 |

In some examples, ELEM_BYTES ranges from 1 to 64 bytes as shown in Table 5.

TABLE 5

| ELEM_BYTES | Stream Element Length |
|---|---|
| 000 | 1 byte |
| 001 | 2 bytes |
| 010 | 4 bytes |
| 011 | 8 bytes |
| 100 | 16 bytes |
| 101 | 32 bytes |
| 110 | 64 bytes |
| 111 | Reserved |

The definition above maps consecutive elements of the stream to increasing addresses in memory. This works well for most algorithms but not all. Some algorithms are better served by reading elements in decreasing memory addresses, referred to as reverse stream addressing. For example, a discrete convolution computes vector dot-products, as per the formula given by Equation 4:

$$(f, g)[t] = \sum_{x=-\infty}^{\infty} f[x]g[t-x] \quad \text{Equation 4}$$

In some examples, in DSP code, f[ ] and g[ ] represent arrays in memory. For each output, the algorithm reads f[ ] in the forward direction, but reads g[ ] in the reverse direction. Practical filters limit the range of indices for [x] and [t-x] to a finite number of elements. To support this pattern, the streaming engine 1900 can support reading elements in decreasing address order.

Matrix multiplication can present a unique problem to the streaming engine 1900. Each element in the matrix product is a vector dot product between a row from the first matrix and a column from the second. In some examples, programs store matrices all in row-major or column-major order. Row-major order stores all the elements of a single row contiguously in memory. Column-major order stores all elements of a single column contiguously in memory. Matrices typically get stored in the same order as the default array order for the language. As a result, only one of the two matrices in a matrix multiplication map on to the streaming engine's 2-dimensional stream definition. In an example, a first index steps through columns of a first array but rows of a second array. This problem is not unique to the streaming engine 1900. Matrix multiplication's access pattern fits poorly with most general-purpose memory hierarchies. Some software libraries transpose one of the two matrices, so that both get accessed row-wise (or column-wise) during multiplication. The streaming engine supports implicit matrix transposition with transposed streams. Transposed streams avoid the cost of explicitly transforming the data in memory. Instead of accessing data in strictly consecutive-element order, the streaming engine effectively interchanges the inner two loop dimensions in its traversal order, fetching elements along the second dimension into contiguous vector lanes.

This algorithm works, but is impractical to implement for small element sizes. Some algorithms work on matrix tiles, which are multiple columns and rows together. Therefore, the streaming engine 1900 defines a separate transposition granularity. The hardware imposes a minimum granularity. The transpose granularity must also be at least as large as the element size. Transposition granularity causes the streaming engine 1900 to fetch one or more consecutive elements from dimension zero before moving along dimension one. When the granularity equals the element size, this results in fetching a single column from a row-major array. Otherwise, the granularity specifies fetching two, four, or more columns at a time from a row-major array. This is also applicable for column-major layout by exchanging row and column in the description. A parameter GRANULE indicates the transposition granularity in bytes.

Another common matrix multiplication technique exchanges the innermost two loops of the matrix multiply. The resulting inner loop no longer reads down the column of one matrix while reading across the row of another. For example, the algorithm may hoist one term outside the inner loop, replacing it with the scalar value. On a vector machine, the innermost loop can be implemented very efficiently with a single scalar-by-vector multiply followed by a vector add. In some examples, a CPU 106 lacks a scalar-by-vector multiply. Programs instead may duplicate the scalar value across the length of the vector and use a vector-by-vector multiply. The streaming engine 1900 directly supports this and related use models with an element duplication mode. In this mode, the streaming engine 1900 reads a granule smaller than the full vector size and replicates that granule to fill the next vector output.

The streaming engine 1900 treats each complex number as a single element with two sub-elements that give the real and imaginary (rectangular) or magnitude and angle (polar) portions of the complex number. Not all programs or peripherals agree what order these sub-elements should appear in memory. Therefore, the streaming engine 1900 offers the ability to swap the two sub-elements of a complex number with no cost. This feature swaps the halves of an element without interpreting the contents of the element and can be used to swap pairs of sub-elements of any type, not just complex numbers.

Algorithms generally prefer to work at high precision, but high precision values require more storage and bandwidth than lower precision values. Commonly, programs will store data in memory at low precision, promote those values to a higher precision for calculation and then demote the values to lower precision for storage. The streaming engine 1900 supports this directly by allowing algorithms to specify one level of type promotion. In some examples, every sub-element may be promoted to a larger type size with either sign or zero extension for integer types. It is also feasible that the streaming engine 1900 may support floating point promotion, promoting 16-bit and 32-bit floating point values to 32-bit and 64-bit formats, respectively.

The streaming engine 1900 defines a stream as a discrete sequence of data elements. The CPU 106 consumes data elements packed contiguously in vectors. Vectors resemble streams, in that they contain multiple homogeneous elements with some implicit sequence. The streaming engine 1900 reads streams, but the CPU 106 consumes vectors; accordingly, the streaming engine 1900 is configured to consistently map streams onto vectors.

Vectors consist of equal-sized lanes, each lane containing a sub-element. The CPU 106 designates the rightmost lane of the vector as lane 0, regardless of the device's current endian mode. Lane numbers increase right-to-left. The actual number of lanes within a vector varies depending on the length of the vector and the data size of the sub-element.

Figure 20:
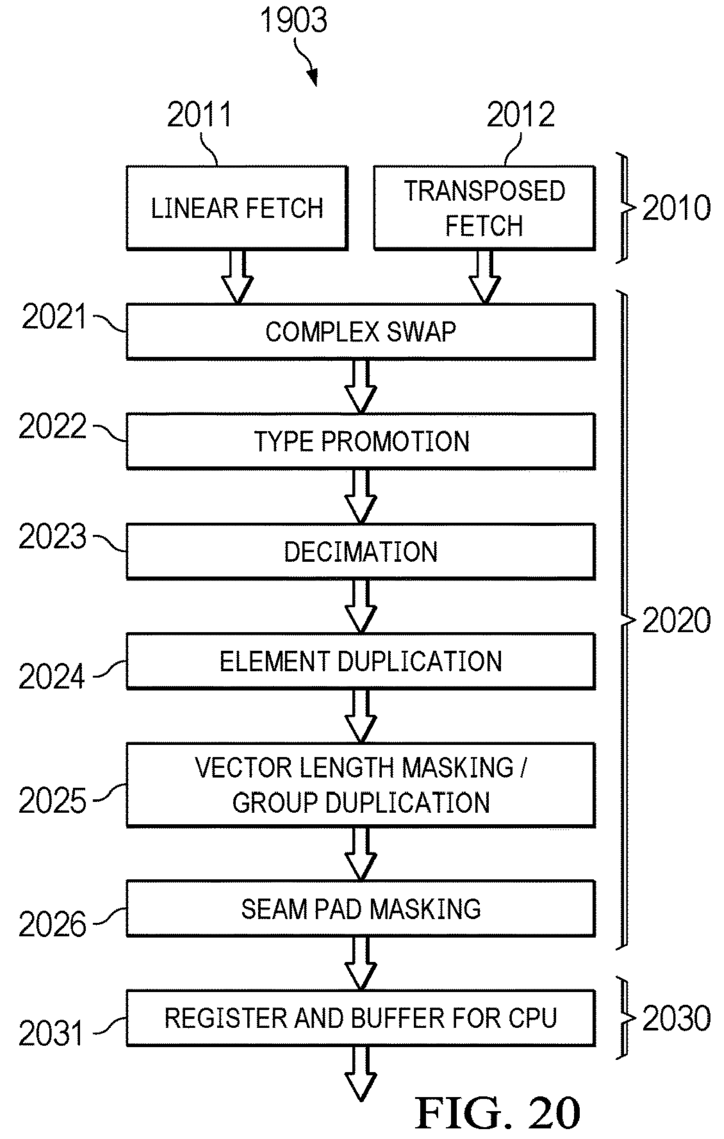
FIG. 20 illustrates an example sequence of formatting operations of a streaming engine, such as the formatting operations of the feature data alignment and pad insertion blocks of the first streaming engine of FIG. 1, or the formatting operations of the formatter of the streaming engine of FIG. 19.

FIG. 20 illustrates an example sequence of formatting operations 2000 of a streaming engine, such as the formatting operations of the feature data alignment 116 and pad insertion 118 blocks of the first streaming engine 114 of FIG. 1, or the formatting operations of the formatter 1903 of the streaming engine 1900 of FIG. 19. The sequence of formatting operations 2000 includes three sections: an input section 2010, a formatting section 2020, and an output section 2030. The input section 2010 receives the data recalled from memory, such as the L2 cache 112 or system memory 1910, as accessed by an address generator, such as the address generator 117 or stream address generator 1901. This data could be via linear fetch stream 2011 or transposed fetch stream 2012.

Formatting section 2020 includes various formatting blocks. Complex swap block 2021 optionally swaps two sub-elements forming a complex number element. Type promotion block 2022 optionally promotes each data element into a larger data size. Promotion includes zero extension for unsigned integers and sign extension for signed integers. Decimation block 2023 optionally decimates the data elements. In some examples, decimation can be 2:1 retaining every other data element or 4:1 retaining every fourth data element. Element duplication block 2024 optionally duplicates individual data elements. This data element duplication can be an integer power of 2 ($2^N$, when N is an integer), including 2×, 4×, 8×, 16×, 32×, and 64×. In some examples, data duplication can extend over plural destination vectors. Vector length masking/group duplication block 2025 has two primary functions. An independently specified vector length VECLEN controls the data elements supplied to each output data vector. When group duplication is off, excess lanes in the output data vector are zero filled and these lanes are marked invalid. When group duplication is on, input data elements of the specified vector length are duplicated to fill the output data vector. Seam pad masking block 2026 performs pad insertion, as discussed above.

Output section 2030 holds the data for output to the corresponding functional units. Register and buffer for CPU 2031 stores a formatted vector of data to be used as an operand by the functional units of the CPU 106 (or the CPU 1920).

Figure 21:
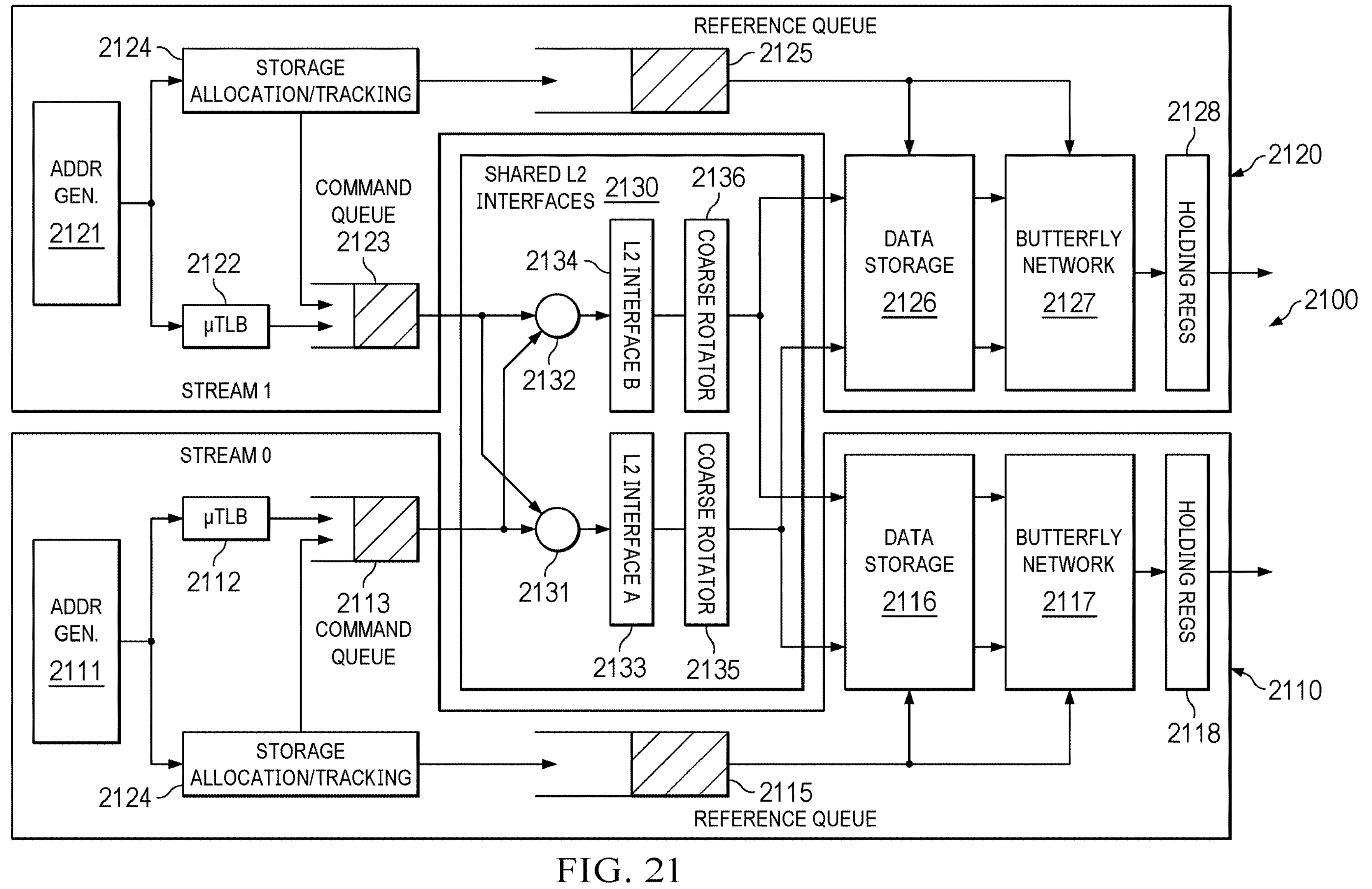
FIG. 21 illustrates an example streaming engine.

FIG. 21 illustrates an example streaming engine 2100. Streaming engine 2100 contains three major sections: Stream 0 2110; Stream 1 2120; and Shared L2 Interfaces 2130. Stream 0 2110 and Stream 1 2120 both contain identical hardware that operates in parallel. Stream 0 2110 and Stream 1 2120 both share L2 interfaces 2130. Each stream 2110 and 2120 provides the CPU 106 with up to 512 bits/cycle, every cycle. The streaming engine architecture enables this through its dedicated stream paths and shared dual L2 interfaces.

Each streaming engine 2100 includes a dedicated 6-dimensional stream address generator 2111/2121 that can each generate one new non-aligned request per cycle. Address generators 2111/2121 output 512-bit aligned addresses that overlap the elements in the sequence defined by the stream parameters. This will be further described below.

Each address generator 2111/2111 connects to a dedicated micro table look-aside buffer (μTLB) 2112/2122. The μTLB 2112/2122 converts a single 48-bit virtual address to a 44-bit physical address each cycle. Each μTLB 2112/2122 has 8 entries, covering a minimum of 32 kB with 4 kB pages or a maximum of 16 MB with 2 MB pages. Each address generator 2111/2121 generates 2 addresses per cycle. The TLB 2112/2122 only translates 1 address per cycle. To maintain throughput, streaming engine 2100 takes advantage of the fact that most stream references will be within the same 4 kB page. Thus, the address translation does not modify bits 0 to 11 of the address. If aout0 and aout1 line in the same 4 kB page (aout0[47:12] are the same aout1[47:12]), then the TLB 2112/2122 only translates aout0 and reuses the translation for the upper bits of both addresses.

Translated addresses are queued in command queue 2113/2123. These addresses are aligned with information from the corresponding Storage Allocation and Tracking block 2114/2124. Streaming engine 2100 does not explicitly manage TLB 2112/2122. The system memory management unit (MMU) invalidates TLBs as necessary during context switches.

Storage Allocation and Tracking 2114/2124 manages the stream's internal storage, discovering data reuse and tracking the lifetime of each piece of data. This will be further described below.

Reference queue 2115/2125 stores the sequence of references generated by the corresponding address generator 2111/2121. This information drives the data formatting network so that it can present data to the CPU 106 in the correct order. Each entry in reference queue 2115/2125 contains the information necessary to read data out of the data store and align it for the CPU 106. Reference queue 2115/2125 maintains the following information listed in Table 6 in each slot:

TABLE 6

| | |
|---|---|
| Data Slot Low | Slot number for the lower half of data associated with aout0 |
| Data Slot High | Slot number for the upper half of data associated with aout1 |
| Rotation | Number of bytes to rotate data to align next element with lane 0 |
| Length | Number of valid bytes in this reference |

Storage allocation and tracking 2114/2124 inserts references in reference queue 2115/2125 as address generator 2111/2121 generates new addresses. Storage allocation and tracking 2114/2124 removes references from reference queue 2115/2125 when the data becomes available and there is room in the stream head registers. As storage allocation and tracking 2114/2124 removes slot references from reference queue 2115/2125 and formats data, it checks whether the references represent the last reference to the corresponding slots. Storage allocation and tracking 2114/2124 compares reference queue 2115/2125 removal pointer against the slot's recorded Last Reference. If they match, then storage allocation and tracking 2114/2124 marks the slot inactive once it's done with the data.

Streaming engine 2100 has data storage 2116/2126 for an arbitrary number of elements. Deep buffering allows the streaming engine to fetch far ahead in the stream, hiding memory system latency. The right amount of buffering might vary from product generation to generation. In the current preferred embodiment streaming engine 2100 dedicates 32 slots to each stream. Each slot holds 64 bytes of data.

Butterfly network 2117/2127 consists of a 7 layer butterfly network. Butterfly network 2117/2127 receives 64 bytes of input and generates 64 bytes of output. The first layer of the butterfly is actually a half-stage. It collects bytes from both slots that match a non-aligned fetch and merges them into a single, rotated 64-byte array. The remaining 6 layers form a standard butterfly network. Butterfly network 2117/2127 performs the following operations: rotates the next element down to byte lane 0; promotes data types by a power of 2, if requested; swaps real and imaginary components of complex numbers, if requested; converts big endian to little endian if the CPU 106 is presently in big endian mode. The user specifies element size, type promotion and real/imaginary swap as part of the stream's parameters.

Butterfly networks can achieve various transformations from input to output data from relatively simple hardware (one 2×1 mux per element for each layer), however the control of these MUX elements for each pattern is complicated and can involve a large amount of storage. A simple combinational logic method is shown to generate the controls required by a butterfly network to implement a plurality of alignments of the input data.

For additional flexibility the butterfly network may also be constructed as an inverse butterfly network. In the inverse butterfly network, the data flow is reversed, with input 2201 becoming the output, and output 2208 becoming the input.

Figure 22:
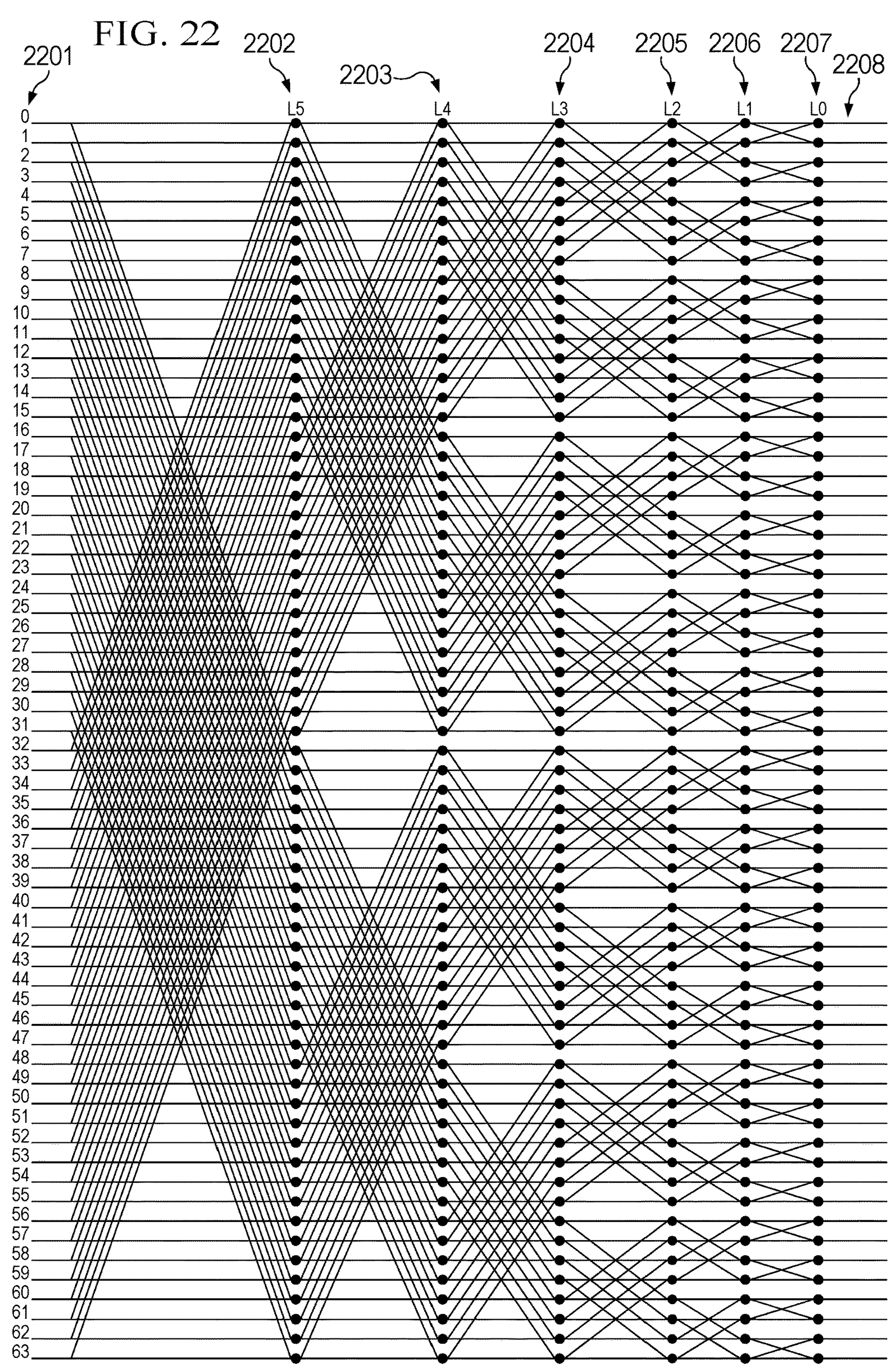
FIG. 22 shows an example 64 section butterfly network.

FIG. 22 shows an example a 64 section butterfly network 2200. Input data 2201 can be transformed by the 6 layer butterfly network 2200 with outputs 2208. Layer L5 2202 consists of 64 2×1 multiplexers, arranged in a 2×32 format. Layer L4 2203 consists of 64 2×1 multiplexers, arranged in a 4×16 format. Layer L3 2204 consists of 64 2×1 multiplexers arranged in an 8×8 format. Layer L2 2205 consists of 64 2×1 multiplexers arranged in a 4×16 format, and layer L1 2206 also consists of 64 2×1 multiplexers arranged in a 2×32 format. Final layer L0 2207 also consists of 64 2×1 multiplexers and select the last section of the output data word. In a generalized case if the data width is n, (where n is an integral power of 2) one layer is needed for each section of the data width, with n 2×1 multiplexers in each layer.

In FIG. 22 the number of sections n is 64, therefore 6 butterfly layers are required ($\log_2(64)=6$). Each layer consists of 64 2×1 multiplexers. Each layer is connected to outputs of multiplexers of prior layers as follows. Input data 2201 sections 0 to 63 are connected to the first input (input 0) of corresponding multiplexers in layer L5 2202. For all subsequent layers (layer L4 2203, layer L3 2204, layer L2 2205, layer L1 2206 and layer L0 2207) input 0 of each multiplexer is connected to the output of a corresponding multiplexer of the immediately prior layer.

Input 1 of each multiplexer of each layer is connected to another multiplexer output of the immediately prior than input 0. Input data 2201 sections 0 to 31 are connected to the second input (input 1) of respective layer L5 2202 multiplexers 32 to 63. Input data 2201 sections 32 to 63 are connected to input 1 of respective layer L5 2202 multiplexers 0 to 31.

The outputs of layer L5 2202 sections 0 through 15 are connected to the second input of respective layer L4 2203 multiplexers 16 through 31. Outputs of layer L5 2202 multiplexers 16 through 31 are connected to the second input of second layer multiplexers 0 through 15. Outputs of layer L5 2202 multiplexers 32 through 47 are connected to the second inputs of respective layer L4 2203 multiplexers 48 to 63. Outputs of layer L5 2202 multiplexers 48 through 63 are connected to the second inputs of respective layer L4 2203 multiplexers 32 to 47.

The outputs of layer L4 2203 sections 0 through 7 are connected to the second input of respective layer L3 2204 multiplexers 8 through 15. The outputs of layer L4 2203 sections 8 through 15 are connected to the second input of respective layer L3 2204 multiplexers 0 through 7. The outputs of layer L4 2203 sections 16 through 23 are connected to the second input of respective layer L3 2204 multiplexers 24 through 31. The outputs of layer L4 2203 sections 24 through 31 are connected to the second input of respective layer L3 2204 multiplexers 16 through 23. The outputs of layer L4 2203 sections 32 through 39 are connected to the second input of respective layer L3 2204 multiplexers 40 through 47. The outputs of layer L4 2203 sections 40 through 47 are connected to the second input of respective layer L3 2204 multiplexers 32 through 39. The outputs of layer L4 2203 sections 48 through 55 are connected to the second input of respective layer L3 2204 multiplexers 55 through 63. The outputs of layer L4 2203 sections 56 through 63 are connected to the second input of respective layer L3 2204 multiplexers 48 through 55.

The outputs of layer L3 2204 sections 0 through 3 are connected to the second input of respective layer L2 2205 multiplexers 4 through 7. The outputs of layer L3 2203 sections 4 through 7 are connected to the second input of respective layer L2 2205 multiplexers 0 through 3. The outputs of layer L3 2204 sections 8 through 11 are connected to the second input of respective layer L2 2205 multiplexers 12 through 15. The outputs of layer L3 2203 sections 12 through 15 are connected to the second input of respective layer L2 2205 multiplexers 8 through 11.

Layers L2, L1 and L0 are similarly formed. In general, the multiplexer supplying the second input of a multiplexer of the adjacent layer is given as follows. For the case of $\log_2$ (n) layers of n multiplexers; i is the i-th multiplexer numbered from 1 to n in a layer; j is the j-the layer numbered from 1 to $\log_2$ (n), where the first layer is nearest the output and the $\log_2$ (n) layer is nearest the input: for the input layer the second input receives data of an input section corresponding to:

if (i) $\text{mod}_{(2^j)} \le 2^{(j-1)}$, then the input section number is $i+2^{(j-1)}$, and if (i) $\text{mod}_{(2^j)} > 2^{(j-1)}$, then the input section number is $i-2^{(j-1)}$.

For the output layer the second input of each multiplexer of receives data from the output of a multiplexer corresponding to:

if i is odd, then the source multiplexer number is i+1, and if i is even, then the source multiplexer number is i−1.

For other layers the second input of each multiplexer of other layers receives data from the output of a multiplexer corresponding to:

if (i) $\text{mod}_{(2^j)} 2^{(j-1)}$, then the source multiplexer number is $i+2^{(j-1)}$, and if (i) $\text{mod}_{(2^j)} > 2^{(j-1)}$ then the source multiplexer number is $i-2^{(j-1)}$.

As seen by inspection of FIG. 22, the second inputs of the multiplexers in the butterfly network all come from a multiplexer of the prior layer displaced by $2^{(j-1)}$. The multiplexers in a first half of a group of $2^j$ multiplexers, are displaced to a multiplexer having a higher number by $2^j$. The multiplexers in a second half of the group of $2^j$ multiplexers, are displaced to a multiplexer having a lower number by $2^j$. The modulo operation noted above ((i) $\text{mod}_{(2^j)}$) determines the group half and is used to set the addition (higher source multiplexer number) or subtraction (lower source multiplexer number). The output layer represents a special case where an even/odd determination is substituted for the modulo operation.

In accordance with the preferred embodiment, the vector data width of 512 bits is segmented into 64 sections of the minimum data width of 8 bits. Thus each 2×1 multiplexer in butterfly network 2200 is 8 bits wide.

The butterfly network illustrated in FIG. 22 is capable of making many data transformations. This presents a difficulty in controlling the multiplexers of the respective layers.

Since many transformations are possible and in general each multiplexer may be separately controlled, there are a large number of possible control states of this network. In some examples a limited set of multiplexer control signals are allowed, which enables a similarly limited set of data transformations. This limited capability is offset by the reduced complexity of the multiplexor control circuits.

As an example, using the 64 bit butterfly network shown in FIG. 22 with data input set forth in Table 6.1:

TABLE 6.1

| 63 | 62 | . . . | 33 | 32 | 31 | 30 | . . . 1 | 0 |
|---|---|---|---|---|---|---|---|---|
| d31 | d30 | . . . | d1 | d0 | d63 | d62 | . . . d33 | d32 |

And a desired data output set forth in Table 6.2:

TABLE 6.2

| 63 | 62 ... | 33 | 32 | 31 | 30 | ... 1 | 0 |
|---|---|---|---|---|---|---|---|
| d0 | d1 ... | d31 | d32 | d33 | d34 | ... d62 | d63 |

This transformation involves two operations: rotate to the right by 32 sections; and reverse the vector. For this simple example the needed controls for the two operations can be made by inspection. To rotate by 32 sections, all the layer L5 2202 multiplexers are set to the second input (input 1) and all other multiplexers are set to the first input (input 0). This can be expressed as:

L5: 1
L4: 0
L3: 0
L2: 0
L1: 0
L0: 0

To reverse the sections, all the multiplexers are set to the second input (input 1).

This can be expressed as:

L5: 1
L4: 1
L3: 1
L2: 1
L1: 1
L0: 1

Note that the multiplexer controls for all multiplexers in a given layer are the same. The desired two transformations can be achieved by XORing the controls for each layer. Thus:

L5: 1 XOR 1=0
L4: 0 XOR 1=1
L3: 0 XOR 1=1
L3: 0 XOR 1=1
L2: 0 XOR 1=1
L1: 0 XOR 1=1
L0: 0 XOR 1=1

Table 7 shows examples of transformations and the corresponding multiplexer control signals for the butterfly network 2200.

TABLE 7

| Multiplexer Control Signals | | | | | | |
|---|---|---|---|---|---|---|
| L5 | L4 | L3 | L2 | L1 | L0 | Transformation |
| 1 | 0 | 0 | 0 | 0 | 0 | 32 section rotate right |
| 1 | 1 | 1 | 1 | 1 | 1 | reverse vector |
| 0 | 0 | 0 | 0 | 0 | 1 | 1 section shuffle |
| 0 | 0 | 1 | 0 | 0 | 0 | 8 section swap |

Modifications are possible in the described embodiments, and other embodiments are possible, within the scope of the claims.

In some examples, an SoC 104, or zero padding as described herein, is used in a system other than an image recognition system.

In some examples, a processor other than a CPU, such as a DSP, is used in an SoC 104 as described in FIG. 1.

In some examples, input data other than image data is used, such as captured sound data; for example, to perform natural language processing.

In some examples, a deep learning model other than a convolutional neural network is used, such as a transformer.

In some examples, methods and systems described herein are applied to deep learning model layers other than or in addition to convolutional layers, such as de-convolutional layers and pixel-shuffle layers.

In some examples, the first streaming engine 114 and the second streaming engine 120 are a single memory controller. In some examples, feature map data and weights data are handled differently by (for example, are processed by different pipeline portions of) the single memory controller.

In some examples, vectors and matrices described herein with respect to a particular row or column orientation are transposed.

In some examples, input feature maps and zero padded input feature maps described as written in L2 cache 112 are written on fewer memory lines of L2 cache 112 than the respective illustrated feature maps have matrix rows. In some examples, input feature maps and zero padded input feature maps described as written in L2 cache 112 are written on a single line of L2 cache 112.

In some examples, input feature maps are stored in a memory other than an L2 cache 112, such as an L3 cache, shared cache, or external memory.

In some examples, input feature maps are stored in an L2 memory other than L2 cache 112, such as L2 SRAM (static random access memory).

In some examples, a memory controller other than a streaming engine (such as the first streaming engine 114) is used to retrieve and zero pad the input feature map(s).

In some examples, reading input feature map(s) from the L2 cache 112 does not bypass the L1 cache 110. In some examples, writing input feature map(s) to the MMA accelerator memory 109 does not bypass the L1 cache 110.

In some examples, more zero padding is added than in the examples described above, such as with respect to FIG. 11. In some examples, zero padding is arranged differently than as described above, such as with respect to FIG. 11.

In some examples, side pad columns are not distributed as symmetrically as possible on the left and right hands of a respective input feature map. In some examples, vertical pad rows are not distributed as symmetrically as possible above and below a respective input feature map. In such examples, masking locations are adjusted accordingly.

In some examples, the "force bit 0" signal is used to set output bits of the second shifter network 1810 other than or in addition to bit 0 to a desired value.

In some examples, the AND logic gate 1708 is referred to as a mixing circuit. In examples, the mixing circuit includes structure additional to or instead of the AND logic gate 1708 to generate padded data in response to outputs of the butterfly network 1704 and the mask generation block 1706.

In some examples, butterfly network structure and control are arranged differently than described herein.

In some examples, masking control information stored by the reference queue 1712 includes information that, in a final reference prior to an advance (horizontal stride, also referred to as a seam pad (SPAD) finite state machine (FSM) update), causes advance signals to be sent by the reference queue 1712 to advance offsets for the feature map and the filter, and causes pattern offsets for the feature map and the kernel filter to respectively be reset to respective pattern offset values corresponding to the start of a stream (the kernel filter offset is referred to above as the current kernel filter column).

In some examples, both the first streaming engine 114 and the second streaming engine 120 include pad insertion capability.

In some examples, the address generator 117 of the first streaming engine 114 and the address generator 126 of the second streaming engine 120 have different access patterns.

In some examples, a mask generator can be configured to enable negative pattern offsets to be used, with i iterating from zero to the number of repetitions of the pattern to be generated minus one.

In some examples, an MMA accelerator 108 is configured to treat null values other than padding zeroes so that performing mathematical operations on the null values produces the same results as performing the same mathematical operations on padding zeroes.

What is claimed is:

1. A method of operating an integrated circuit (IC), comprising:

storing in a first memory multiple rows of an input feature map on a single line of cells of the first memory;

storing a filter kernel in the first memory;

reading vectors of contiguous memory (contiguous memory vectors) of the first memory, different ones of the contiguous memory vectors corresponding to different portions of the input feature map;

replacing with null values a number N>0 of values at selected locations of respective ones of the contiguous memory vectors located at either each beginning or each end of the rows of the input feature map within the respective contiguous memory vector, the number and location selected in response to a column index of an element of the filter kernel in response to which the respective contiguous memory vector is read, to generate padded contiguous memory vectors; and writing the padded contiguous memory vectors to a second memory.

2. The method of claim 1, further including:

reading the filter kernel from the first memory and writing it to the second memory; and performing convolution of the filter kernel stored in the second memory with the padded contiguous memory vectors stored in the second memory.

3. The method of claim 2, wherein the performing uses all of each of the padded contiguous memory vectors.

4. The method of claim 1, wherein the first memory is an L2 memory; and wherein the reading is performed using a datapath that bypasses an L1 cache memory.

5. The method of claim 4, further including formatting the contiguous memory vectors using a butterfly network to generate formatted contiguous memory vectors;

wherein the replacing step includes generating a mask, and generating the padded contiguous memory vectors in response to the formatted contiguous memory vectors and the mask.

6. The method of claim 1, wherein the first memory does not store side pad zeroes of the input feature map.

7. The method of claim 1, further including selecting the number N and the location in response to a number of columns K of the column index from a center column index of the filter kernel.

8. The method of claim 7, wherein the center column index is responsive to a modeled distribution of side pad columns between a left-hand side of the input feature map and a right-hand side of the input feature map.

9. The method of claim 1, wherein the column index is a number of columns K=N from a center column index of the filter kernel;

wherein the replacing replaces with null values at the beginning of each input feature map row within the respective contiguous memory vector if the column index is to the right of the center column index of the filter kernel;

wherein the replacing replaces with null values at the end of each input feature map row within the respective contiguous memory vector if the column index is to the left of the center column index of the filter kernel.

10. The method of claim 1, wherein a starting location of the respective contiguous memory vector is shifted K values prior to a first value of the input feature map if the column index is to the left of the center column index of the filter kernel; and wherein a starting location of the respective contiguous memory vector is shifted K values after a first value of the input feature map if the column index is to the right of the center column index of the filter kernel.

11. The method of claim 1, wherein the column index is a number of columns K=N from a center column index of the filter kernel;

wherein the input feature map has a column dimension Lc;

wherein values are replaced at a beginning of each group of Lc values in the respective contiguous memory vector if the column index is to the left of the center column index of the filter kernel; and wherein values are replaced at an end of each group of Lc values in the respective contiguous memory vector if the column index is to the right of the center column index of the filter kernel.

12. An integrated circuit (IC), comprising:

a matrix multiplication accelerator (MMA) including a first memory;

a second memory configured to store multiple rows of an input feature map on a single line of cells of the memory, and to store a filter kernel; and a memory controller configured to:

read multiple vectors of contiguous memory (contiguous memory vectors) of the second memory, different ones of the contiguous memory vectors corresponding to different portions of the input feature map;

replace with null values a number N>0 of values of respective ones of the contiguous memory vectors located at either each beginning or each end of the rows of the input feature map within the respective contiguous memory vector, the number and location selected in response to a column index of an element of the filter kernel in response to which the respective contiguous memory vector is read, to generate padded contiguous memory vectors; and write the padded contiguous memory vectors to the first memory.

13. The IC of claim 12, wherein the memory controller is configured to read the filter kernel from the second memory and write it to the first memory; and further including a processor configured to use the MMA to perform convolution of the filter kernel stored in the first memory with the padded contiguous memory vectors stored in the first memory.

14. The IC of claim 13, wherein the processor is configured to use all of each of the padded contiguous memory vectors to perform the convolution action.

15. The IC of claim 12, wherein the memory controller is a streaming engine.

16. The IC of claim 12, further including an L1 cache memory;

wherein the second memory is an L2 memory; and wherein the read action is performed using a datapath that bypasses the L1 cache memory.

17. The IC of claim 16, wherein the memory controller includes:

a butterfly network configured to format the contiguous memory vectors to generate formatted contiguous memory vectors;

a mask generation block configured to generate a mask corresponding to the values to be padded; and a mixing circuit configured to generate ones of the padded contiguous memory vectors in response to corresponding ones of the formatted contiguous memory vectors and the mask.

18. The IC of claim 17, wherein the mixing circuit is an AND logic gate.

19. The IC of claim 12, wherein the number N and the location are selected in response to a number of columns K of the column index from a center column index of the filter kernel.

20. The IC of claim 19, wherein the column index is a number of columns K=N from a center column index of the filter kernel;

wherein the memory controller is configured to replace with null values at the beginning of each input feature map row within the respective contiguous memory vector if the column index is to the right of the center column index of the filter kernel;

wherein the memory controller is configured to replace with null values at the end of each input feature map row within the respective contiguous memory vector if the column index is to the left of the center column index of the filter kernel.

* * * * *